United States Patent
Fagan et al.

(10) Patent No.: US 10,452,243 B2
(45) Date of Patent: Oct. 22, 2019

(54) SYSTEM AND METHOD OF OPERATION OF THE SYSTEM INCORPORATING A GRAPHICAL USER INTERFACE IN A SIDE LEDGE OF A VEHICLE CABIN

(71) Applicant: BOMBARDIER INC., Dorval (CA)

(72) Inventors: Tim Michael Fagan, Beaconsfield (CA); Christian Sean Johnson, Vaudreuil-Dorion (CA); Brian Conner, Seattle, WA (US); Jeff Bartenbach, Seattle, WA (US); Linsey Nancarrow, Seattle, WA (US); Tom Hobbs, Seattle, WA (US); Erick Waldman, Seattle, WA (US); Sebastian Petry, Seattle, WA (US)

(73) Assignee: BOMBARDIER INC., Dorval, Quebec (CA)

( * ) Notice: Subject to any disclaimer, the term of this patent is extended or adjusted under 35 U.S.C. 154(b) by 546 days.

(21) Appl. No.: 14/165,004

(22) Filed: Jan. 27, 2014

(65) Prior Publication Data
US 2016/0062618 A1    Mar. 3, 2016

Related U.S. Application Data

(60) Provisional application No. 61/759,152, filed on Jan. 31, 2013.

(51) Int. Cl.
G06F 3/0484  (2013.01)
G06F 3/0482  (2013.01)
(Continued)

(52) U.S. Cl.
CPC ........ G06F 3/04847 (2013.01); G06F 3/0338 (2013.01); G06F 3/0362 (2013.01);
(Continued)

(58) Field of Classification Search
CPC .. G06F 3/04847; G06F 3/0482; G06F 3/0362; G06F 3/0488; G06F 3/0338; G06F 3/03547; H01H 2003/085; Y10T 74/2084
(Continued)

(56) References Cited

U.S. PATENT DOCUMENTS 4,501,013 A *  2/1985  Sato ........................ B60R 11/02
                                                     381/86
5,555,458 A     9/1996  Large
(Continued)

FOREIGN PATENT DOCUMENTS

DE    102006006363 A1    8/2007
DE    102007043379 A1    4/2009
(Continued)

OTHER PUBLICATIONS

Frequent Flying, "Vintage Airline Seat Map Eastern Air Lines Boeing 727-100", Jan. 18, 2012, 2 pages, downloaded http://frequentlyflying.boardingarea.com/vintage-airline-seat-map-eastern-air-lines-boeing-727-100/.
(Continued)

*Primary Examiner* — Dino Kujundzic
(74) *Attorney, Agent, or Firm* — Karceski IP Law, PLLC

(57) ABSTRACT

A method of operation for a system incorporating a graphical user interface embedded in a knob disposed on a side ledge within a cabin of an aircraft includes displaying a menu for at least one controllable parameter, receiving a selection of the controllable parameter, displaying at least one control for the selected controllable parameter, receiving a control input for the selected controllable parameter, and adjusting the selected controllable parameter consistent with the control input. The controllable parameter comprises a plurality of controllable parameters selected from a group comprising light intensity, light color, temperature, media (Continued)

type, media content, media volume, and the degree of openness of at least one window shade. A knob and an executable computer program product also are provided.

20 Claims, 24 Drawing Sheets

(51) Int. Cl.
- *G06F 3/0488* (2013.01)
- *G06F 3/0338* (2013.01)
- *G06F 3/0362* (2013.01)
- *G06F 3/0354* (2013.01)

(52) U.S. Cl.
CPC ........ *G06F 3/03547* (2013.01); *G06F 3/0482* (2013.01); *G06F 3/0488* (2013.01)

(58) Field of Classification Search
USPC ....................................................... 715/772
See application file for complete search history.

(56) References Cited

U.S. PATENT DOCUMENTS

| | | | |
|---|---|---|---|
| 6,249,913 B1 | 6/2001 | Galipeau et al. | |
| 6,343,127 B1 | 1/2002 | Billoud | |
| 6,448,907 B1 | 9/2002 | Naclerio | |
| 6,988,246 B2 | 1/2006 | Kopitzke et al. | |
| 7,114,171 B2 | 9/2006 | Brady, Jr. et al. | |
| 7,500,716 B2 | 3/2009 | Guerin et al. | |
| 7,509,587 B2 | 3/2009 | Kopitzke et al. | |
| 7,878,586 B2 | 2/2011 | Kneller et al. | |
| 7,908,158 B2 | 3/2011 | Stirlen et al. | |
| 8,037,500 B2 | 10/2011 | Margis et al. | |
| 8,065,463 B2 | 11/2011 | Porath et al. | |
| 8,082,569 B2 | 12/2011 | Brady, Jr. et al. | |
| 8,380,393 B1 | 2/2013 | Ohtomo | |
| 8,613,385 B1 | 12/2013 | Hulet et al. | |
| 9,477,329 B1* | 10/2016 | Ding .................... G06F 3/0362 | |
| 2001/0023499 A1 | 9/2001 | Wakahara | |
| 2002/0022896 A1 | 2/2002 | Dugan | |
| 2003/0132345 A1* | 7/2003 | Lehmann .............. B64C 1/1469 | 244/118.5 |
| 2004/0139467 A1 | 7/2004 | Rogerson et al. | |
| 2004/0145612 A1* | 7/2004 | Kopitzke .............. B64D 11/00 | 715/810 |
| 2005/0001838 A1 | 1/2005 | Gregorio et al. | |
| 2005/0002198 A1 | 1/2005 | Blechschmidt | |
| 2005/0018172 A1 | 1/2005 | Gelfond et al. | |
| 2005/0039305 A1* | 2/2005 | Chirumbolo ............. H01H 3/08 | 16/441 |
| 2005/0185399 A1 | 8/2005 | Beermann et al. | |
| 2005/0121978 A1 | 9/2005 | McAvoy | |
| 2005/0280524 A1 | 12/2005 | Boone et al. | |
| 2006/0045107 A1 | 3/2006 | Kucenas et al. | |
| 2006/0092129 A1 | 5/2006 | Choquet et al. | |
| 2006/0099959 A1 | 5/2006 | Staton et al. | |
| 2006/0155429 A1 | 7/2006 | Boone et al. | |
| 2007/0061847 A1 | 3/2007 | Callahan et al. | |
| 2007/0107277 A1 | 5/2007 | Simms et al. | |
| 2007/0141899 A1 | 6/2007 | Saini et al. | |
| 2007/0179737 A1 | 8/2007 | Kalokitis et al. | |
| 2007/0236926 A1 | 10/2007 | Guard et al. | |
| 2008/0055836 A1 | 3/2008 | Lamoree et al. | |
| 2008/0104642 A1* | 5/2008 | Galipeau ................. H04N 7/10 | 725/76 |
| 2008/0144158 A1 | 6/2008 | Stavaeus et al. | |
| 2008/0157997 A1 | 7/2008 | Bleacher et al. | |
| 2008/0211779 A1* | 9/2008 | Pryor ................. G01C 21/3664 | 345/173 |
| 2008/0230653 A1 | 9/2008 | Mitchell et al. | |
| 2008/0234893 A1 | 9/2008 | Mitchell et al. | |
| 2009/0079705 A1 | 3/2009 | Sizelove et al. | |
| 2009/0083805 A1 | 3/2009 | Sizelove et al. | |
| 2009/0085880 A1* | 4/2009 | Vitale ................. B60R 11/0264 | 345/173 |
| 2009/0109036 A1* | 4/2009 | Schalla .............. B64D 11/0015 | 340/573.1 |
| 2009/0112638 A1 | 4/2009 | Kneller et al. | |
| 2009/0113494 A1 | 4/2009 | Weidel | |
| 2009/0119431 A1 | 5/2009 | Porath et al. | |
| 2009/0127078 A1* | 5/2009 | Hostmann ............... H01H 9/181 | 200/4 |
| 2009/0206070 A1* | 8/2009 | Ortner ..................... F24C 3/124 | 219/398 |
| 2009/0249408 A1 | 10/2009 | Smallhorn | |
| 2009/0288123 A1 | 11/2009 | Havlovick et al. | |
| 2009/0319902 A1 | 12/2009 | Kneller et al. | |
| 2010/0060736 A1 | 3/2010 | Shi et al. | |
| 2010/0060739 A1 | 3/2010 | Salazar | |
| 2010/0064327 A1 | 3/2010 | Lynch et al. | |
| 2010/0070089 A1 | 3/2010 | Harrod et al. | |
| 2010/0159879 A1* | 6/2010 | Salkini .................. H04W 12/08 | 455/411 |
| 2010/0176632 A1* | 7/2010 | Alford ................. B60N 2/0228 | 297/217.3 |
| 2010/0187354 A1 | 7/2010 | Helfrich | |
| 2010/0193633 A1 | 8/2010 | Budinger et al. | |
| 2010/0313146 A1 | 12/2010 | Nielsen et al. | |
| 2011/0004832 A1 | 1/2011 | Canal et al. | |
| 2011/0082616 A1 | 4/2011 | Small et al. | |
| 2011/0126242 A1 | 5/2011 | Cline et al. | |
| 2011/0160937 A1 | 6/2011 | Caillaud et al. | |
| 2011/0162015 A1 | 6/2011 | Holyoake et al. | |
| 2011/0164429 A1* | 7/2011 | Heym .................... B60Q 3/001 | 362/471 |
| 2011/0174926 A1 | 7/2011 | Margis et al. | |
| 2012/0060524 A1 | 3/2012 | Al-Ali | |
| 2012/0110517 A1 | 5/2012 | Sparks et al. | |
| 2012/0130547 A1 | 5/2012 | Fadell et al. | |
| 2012/0131504 A1* | 5/2012 | Fadell .................. F24F 11/0086 | 715/810 |
| 2012/0132746 A1 | 5/2012 | Sizelove | |
| 2012/0254932 A1 | 10/2012 | Hudson et al. | |
| 2013/0005336 A1 | 1/2013 | Ayotte et al. | |
| 2013/0027954 A1 | 1/2013 | Boomgarden et al. | |
| 2013/0063340 A1 | 3/2013 | Mondragon et al. | |
| 2013/0093220 A1 | 4/2013 | Pajic | |
| 2013/0161971 A1 | 6/2013 | Bugno et al. | |
| 2013/0185662 A1 | 7/2013 | Quattrocolo et al. | |
| 2013/0235000 A1 | 9/2013 | Lee et al. | |
| 2013/0290902 A1* | 10/2013 | Martin .................. D06F 39/005 | 715/823 |
| 2014/0067208 A1 | 3/2014 | Klappert et al. | |
| 2014/0085337 A1 | 3/2014 | Velten et al. | |
| 2014/0109080 A1 | 4/2014 | Ricci | |
| 2014/0183011 A1* | 7/2014 | Park ..................... H01H 25/065 | 200/4 |
| 2014/0239677 A1 | 8/2014 | Laib et al. | |
| 2014/0309868 A1 | 10/2014 | Ricci | |
| 2014/0324299 A1 | 10/2014 | Sorensen | |
| 2015/0058777 A1 | 2/2015 | Graumann et al. | |
| 2015/0253750 A1 | 9/2015 | Eronen et al. | |
| 2015/0261379 A1 | 9/2015 | Kneuper et al. | |

FOREIGN PATENT DOCUMENTS

| | | |
|---|---|---|
| DE | 102011112944 A1 | 3/2013 |
| JP | 2003182351 A | 7/2003 |
| WO | WO 0052550 A2 | 9/2000 |
| WO | WO 2009062974 A1 | 5/2009 |

OTHER PUBLICATIONS

Rockwell Collins, "Bombardier CES H D" brochure, 147-1351-000 10/11, © 2011 Rockwell Collins Inc, 8 pages.

Rosen Aviation, "Ultra CMS Technical Manual," Revision Date Mar. 11, 2010, Copyright 2010, Document No. 102350 Rev A, 28 pages.

(56) References Cited

OTHER PUBLICATIONS

Honeywell "Ovation Select 200C Personal Control Unit" brochure, A60-1 090-000-000, Mar. 2009, © 2009 Honeywell International Inc., 4 pages.

Elo Touch Solutions, "In Flight Entertainment/Cabin Management" (http://www.elotouch.com/Solutions/Transportation/air.asp for a description of an early (2006) "Flight Attendant Panel (FAP)"), 2006.

Heller et al., "Spectrum Sensing for Cognitive Wireless Applications Inside Aircraft Cabin," 31st Digital Avionics Systems Conference, Oct. 14-18, 2012.

http://www.airliners.net/aviationforums/tech_ops/read.main/186678/ 2007 description of (the mounting and operation of) the Airbus Flight Attendant Panel (FAP), Mar. 17-21, 2007.

International Search Report and Written Opinion dated Jul. 25, 2016, for International Patent Application No. PCT/IB2015/ 0059051.

International Search Report and Written Opinion dated Jul. 27, 2016, for International Patent Application No. PCT/IB2015/ 0059049.

International Search Report and Written Opinion dated Aug. 2, 2016, for International Patent Application No. PCT/IB2015/ 0059050.

International Search Report and Written Opinion dated Aug. 3, 2016, for International Patent Application No. PCT/IB2015/ 0059052.

International Search Report and Written Opinion dated Sep. 23, 2016, for International Patent Application No. PCT/IB2015/ 0059053.

Airbus 319 seat map (8/120 configuration), United Airlines, Copyright 2015 United Airlines, Nov. 6, 2015.

Airbus, Single Aisle Technical Training manual Maintenance Course: T1 Lights, select pages (pp. 1, 2, 4-6, 16-20, back cover), Oct. 2005.

JetPhotos.Net, Airbus A320-232 Bulkhead photo, United Airlines, Serial # 503, Mar. 5, 2003, 2 pages. Downloaded from: http//www.jetphotos.net/photo/109418.

SeatGuru, Bulkheads explained: pros and cons, Internet Archive record of https://www.seatguru.com/articles/bulkheads.php from Jan. 30, 2012.

Woods, Martin; The A318: enhancing the A320 Family, in FAST29, Airbus Technical Digest, Dec. 2001, pp. 8-13.

YouTube Screen Shots, Enhanced Fap—Airbus 320, uploaded by cesar soto on Sep. 12, 2007 at https://www.youtube.com/watch?v-IW8ql_3NUjg.

Airliners.Net, "A320 FWD Flight Attendant Panei" Tech Ops Forum, Mar. 17, 2007, 7 pages, downloaded from: http://www.airliners.net/aviationforums/tech_ops/read.main/186678/.

Airbus, "US Airways Flight 1549 A320-214 N106US Landing on the Hudson River", report submitted to the NTSB on Jan. 15, 2009, 54 pages.

Elo Touch Solutions, "Touch is in the air" (describing and depicting a Flight Attendant Panel), Google date: Oct. 3, 2006, 2 pages, downloaded from: http://www.elotouch.com/Solutions/Transportation/air.asp.

Heller, Christoph et al., "Spectrum Sensing for Congitive Wireless Applications inside Aircraft Cabins," 31st IEEE/AIAA Digital Avionics Systems Conference (DASC), Oct. 14-18, 2012, pp. 7E2-1-7E2-9.

\* cited by examiner

SYSTEM AND METHOD OF OPERATION OF THE SYSTEM INCORPORATING A GRAPHICAL USER INTERFACE IN A SIDE LEDGE OF A VEHICLE CABIN

CROSS-REFERENCE TO RELATED APPLICATION(S)

This United States Non-Provisional Patent Application relies for priority on U.S. Provisional Patent Application Ser. No. 61/759,152, filed on Jan. 31, 2013, the entire contents of which are incorporated herein by reference.

FIELD OF THE INVENTION

The present patent application is directed to a system and a method of operation of a system incorporating a graphical user interface that is positioned in a side ledge of a vehicle cabin (also referred to herein as a "side ledge GUI," "side ledge input/output node," or "side ledge IO node"). The side ledge IO node provides control over one or more functions within the cabin of the vehicle. The vehicle may be an aircraft.

DESCRIPTION OF THE RELATED ART

As should be apparent to those skilled in the art, there are a number of functions that may be controlled within the cabin of an aircraft. The functions may be divided into at least two categories: (1) functions related to environment, and (2) functions related to passenger comfort and entertainment.

Environmental functions include, but are not limited to, things such as cabin temperature, the intensity of the cabin lighting, and the degree to which the window shades are open, among other variables.

Functions related to passenger comfort include those related to actuation of a personal reading light, control over the air flow through an overhead vent, positioning of the passenger seat (i.e., upright or reclined), and a remote call for a flight attendant (i.e., a flight attendant call button).

Other functions that are associated with passenger comfort include, but are not limited to control over media type (i.e., audio and/or video), content, and volume. With respect to content, selectivity may be provided so that a passenger may select a genre of music (i.e., jazz music or pop music) or a genre of movies (i.e., comedy or drama), among other variations. As should be apparent to any passenger, individuals may control the volume of the media that has been selected.

At present, selected the environmental functions typically are adjusted by the flight crew for the comfort of all passengers within the aircraft. For example, temperature typically is controlled at a central location within the aircraft cabin, via a thermostat or similar temperature control device. Similarly, the main cabin lighting in the aircraft typically is controlled via a central panel available to the flight crew. As a result, the flight crew can turn on, turn off, or dim the main lights within the aircraft cabin for all of the passengers.

As should be apparent to the airplane traveler, functions associated with passenger comfort and entertainment typically are accessible directly from the passenger's seat.

This basic operational approach to aircraft cabin functions has been employed for many years. As presently configured, the control systems for the environment and for passenger comfort and entertainment within an aircraft operate independently from one another.

Recently, a desire has developed to improve the manner in which aircraft cabin functions are controlled. Specifically, a desire has arisen to develop controls for one or more functions within the cabin of an aircraft from one or more consolidated IO nodes.

SUMMARY OF THE INVENTION

The present invention provides a GUI and a method of operation of a GUI that is disposed within a side ledge in an aircraft. A side ledge is a ledge typically provided adjacent to a passenger's seat, between the seat and the outer wall of the aircraft's fuselage.

In one contemplated embodiment, the side ledge IO node provides to users (whether flight crew, passengers, or other individuals) control over one or more functions within an aircraft cabin.

Among other embodiments, the present invention provides for a method of operation for a system incorporating a graphical user interface embedded in a knob disposed on a side ledge within a cabin of an aircraft. The method includes displaying a menu for at least one controllable parameter, receiving a selection of the controllable parameter, displaying at least one control for the selected controllable parameter, receiving a control input for the selected controllable parameter, and adjusting the selected controllable parameter consistent with the control input. The controllable parameter includes a plurality of controllable parameters selected from a group comprising light intensity, light color, temperature, media type, media content, media volume, and the degree of openness of at least one window shade.

In one contemplated embodiment, the side ledge may include at least one of a ledge adjacent to a passenger seat, a cabinet adjacent to a divan, or a night stand adjacent to a bed.

In another contemplated embodiment, the method includes the step of placing the graphical user interface into a sleep mode if selection of a controllable parameter is not received.

It is contemplated that the plurality of controllable parameters are associated with at least one of the entire cabin of the aircraft, at least one zone within the cabin of the aircraft, or at least one seat within the cabin of the aircraft.

Separately, it is contemplated that the plurality of controllable parameters is controllable via an interface presenting an isometric view of at least a portion of the cabin of the aircraft.

With respect to the method, it is contemplated that the method also may include the step of prioritizing the control input received from the side ledge device in relation to control inputs received from any other input device, thereby avoiding conflicts between the control inputs.

For various parameters, such as light intensity, media volume, temperature, and degree of openness of the at least one window shade, each of these parameters is contemplated to be adjustable between a predetermined minimum and a predetermined maximum.

With respect to the light color, this parameter is contemplated to be adjustable between a predetermined warm color and a predetermined cool color.

In the context of the present invention, at least light intensity may be controlled for at least one of a cabin light, a table light, and a reading light.

With continued reference to the method of the present invention, it is contemplated that the displaying of the menu for the controllable parameter includes displaying a light icon, a media icon, a thermostat icon, and a window shade icon.

The present invention also provides for a knob embedding a graphical user interface disposed on a side ledge within a cabin of an aircraft. The knob embedding the interface includes a first display for displaying at least one controllable parameter, an input for receiving a selection of the controllable parameter, a second display for displaying at least one control for the selected controllable parameter. The input receives a control input for the selected controllable parameter. The controllable parameter comprises a plurality of controllable parameters selected from a group comprising light intensity, light color, temperature, media type, media content, media volume, and the degree of openness of at least one window shade.

The knob of the present invention may include a display panel on a top surface thereof, the display panel being adapted to display at least the first display and the second display.

It is contemplated that the top surface of the knob may be touch sensitive, permitting the top surface to receive the input for the controllable parameter.

It is also contemplated that the input is received by the top surface of the knob via one of a tapping or swiping motion.

Still further, it is contemplated that the knob is rotatable to provide the control input that is proportional to the degree of rotation of the knob.

In one embodiment, the knob is deployable from a surrounding surface in which is knob is incorporated and the knob is retractable such that the top surface is at substantially a same height as the surrounding surface.

It is contemplated that a flight attendant call button may be disposed adjacent to the knob, in proximity to the knob, permitting tandem actuation with the knob.

The present invention also provides an executable computer program product providing instructions for a method of operation for a system incorporating a graphical user interface embedded in a knob disposed on a side ledge within a cabin of an aircraft. The instructions include displaying a menu for at least one controllable parameter, receiving a selection of the controllable parameter, displaying at least one control for the selected controllable parameter, receiving a control input for the selected controllable parameter, and adjusting the selected controllable parameter consistent with the control input. The controllable parameter encompass a plurality of controllable parameters selected from a group comprising light intensity, light color, temperature, media type, media content, media volume, and the degree of openness of at least one window shade.

With respect to the computer program product, the plurality of controllable parameters may be associated with at least one of the entire cabin of the aircraft, at least one zone within the cabin of the aircraft, or at least one seat within the cabin of the aircraft.

In addition, the instructions may include prioritizing the control input received from the side ledge device in relation to control inputs received from any other input device, thereby avoiding conflicts between the control inputs.

Still further aspects of the present invention will be made apparent from the drawings and description that follows.

BRIEF DESCRIPTION OF THE DRAWINGS

The present invention will now be described in connection with the figures appended hereto, in which.

DETAILED DESCRIPTION OF EMBODIMENT(S) OF THE PRESENT INVENTION

Figure 1:
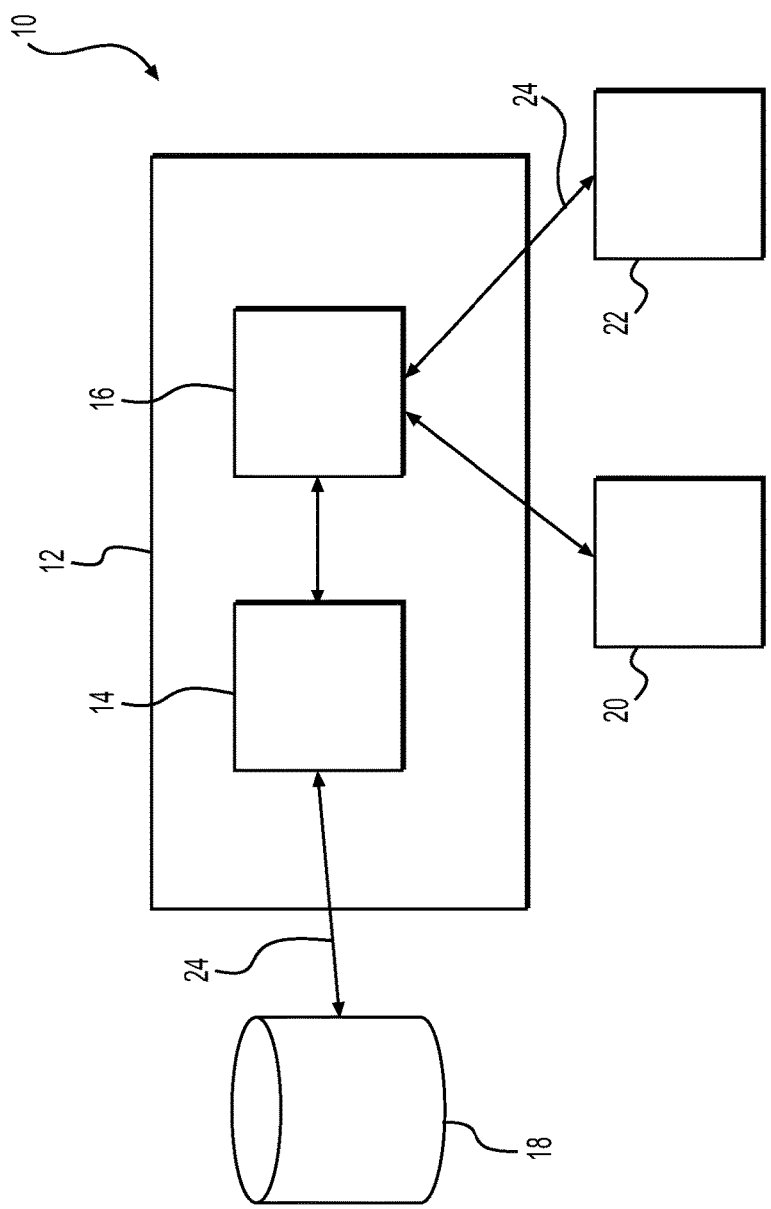
FIG. 1 is a graphical overview of one embodiment of a distributed architecture with which the side ledge IO node of the present invention is contemplated to cooperate.

The present invention will now be described in connection with one or more embodiments. The discussion of any one embodiment is not intended to be restrictive or limiting of the present invention. To the contrary, the embodiments described are intended to be illustrative of the broad scope of the present invention.

Among other aspects, the present invention addresses controls for parameters on board an aircraft including environmental functions and functions related to passenger comfort. As noted above, environmental functions include, but are not limited to, things such as cabin temperature, the intensity of the cabin lighting, and the degree to which the window shades are open, among other variables. Functions related to passenger comfort include those related to actuation of a personal reading light, control over the air flow through an overhead vent, positioning of the passenger seat (i.e., upright or reclined), and a remote call for a flight attendant (i.e., a flight attendant call button). Other functions that are associated with passenger comfort include, but are not limited to control over media type (i.e., audio and/or video), content, and volume. With respect to content, selectivity may be provided so that a passenger may select a genre of music (i.e., jazz music or pop music) or a genre of movies (i.e., comedy or drama), among other variations. Individuals may control the volume of the media that has been selected.

As should be apparent, and as will be made more apparent in the discussion that follows, the labels "environment" and "passenger comfort" when applied to specific functions that are controllable in an aircraft are merely provided to assist with an understanding of the present invention. Use of either of the labels is not intended to be limiting, as the labels are not considered to be mutually exclusive of one another or of other functions that are not highlighted herein. For example, control over the degree to which the window shades are opened qualifies as control over an environmental function and also over aspects of passenger comfort. The lights in the aircraft belong to the same, crossover category.

With respect to the present invention, the terms "front" (or "fore"), "rear" (or "aft"), left (or "port"), and right (or "starboard") are used in the conventional fashion when referring to an aircraft. These conventions refer to the front, rear, left, and right sides of an aircraft as determined by its normal, forward direction of travel.

In addition, reference is made to members of the flight crew on board the aircraft. The term "flight crew" is intended to be generic to any member of the flight crew, including the pilot, co-pilot, and/or flight attendants. In other words, the term "flight crew" is intended to refer to persons other than passengers on board the aircraft.

The term "bulkhead" is used in the discussion of the present invention. A bulkhead is wall that is disposed within the aircraft. A bulkhead may or may not be a structural component of the aircraft.

It is contemplated that the side ledge IO node (or side ledge GUI) of the present invention may be provided on a corporate or private aircraft. In other words, it is contemplated that the present invention may be employed in an aircraft that typically has limited seating by comparison with a commercial, passenger aircraft. While corporate, business, or personal aircraft encompass the primary focus of the side ledge IO node of the present invention, the present invention is not limited just to such aircraft. To the contrary, the present invention may be employed in any aircraft, including commercial passenger aircraft, without departing from the scope of the present invention.

In addition, while the side ledge IO node of the present invention is contemplated to be employed on an aircraft, it is noted that the present invention may be employed in any other suitable environment. For example, the present invention may be practiced on a passenger car of a train, on board a ship, or any other suitable environment that should be apparent to those skilled in the art.

It is contemplated that the side ledge IO node of the present invention will be used in conjunction with a distributed architecture 10, one embodiment of which is illustrated in FIG. 1. The distributed architecture includes a central processing unit 12 ("CPU") that includes a processor 14 and a controller 16. The CPU 12 may be a computer, as should be apparent to those skilled in the art. However, the term CPU 12 is not intended to be limited only to a computer or any part thereof. To the contrary, the term CPU 12 is intended to encompass any type of computing device that may operate to provide the functionality described herein.

The term "processor" is intended to broadly encompass any device capable of executing machine-readable instructions. In other words, the term "processor 14" is intended to refer to any device or component that processes instructions and data. As an example, semiconductor chips within a computer are considered to fall within the definition of the term "processor 14."

While it is contemplated that the processor 14 will be a single component of the distributed architecture 10, the distributed architecture 10 is not intended to be limited solely to such a construction. The processor 14 may include multiple devices that are separate from one another, but cooperate together to process data and execute instructions. For example, the processor 14 may include a semiconductor processing chip and/or any other peripheral devices that support the operation of the semiconductor processing chip. Alternatively, the processor 14 may encompass processing chips that are located in separate systems, but which are operatively connected to provide the desired functionality.

As also illustrated in FIG. 1, the CPU 12 includes a controller 16. In one embodiment, it is contemplated that the controller 16 may be a hardware component that is separate from the processor 14. In a second contemplated embodiment, the controller 16 may be embodied in software (i.e., operating software) that runs on the central processing unit 12. In other words, in this second embodiment, the processor 14 may be the device on which the controller 16 is executed. In a third contemplated embodiment, the controller 16 may be a combination of hardware and software. Regardless of whether the controller 16 is hardware, software, or a combination of the two, it is contemplated that the controller 16 will facilitate communication between the processor 14 and any input/output ("IO") and/or peripheral devices connected thereto. The peripheral devices include the side ledge IO node of the present invention.

While the distributed architecture 10 is described in terms of a CPU 12, a processor 14, and a controller 16 (among other components), it is noted that this configuration is not intended to be illustrative of the breadth of the present invention. The configuration is not intended to exclude any possible server/client configurations. For example, the CPU 12 may be a server on which a client is resident. The controller 16 may be the client. In another configuration, the CPU 12 may be a server that provides access to an independent client. In still another configuration, the CPU 12 may be a router.

As should be apparent, there are many appellations that may be applied to the components comprising the distributed architecture 10. Those variations and equivalents are intended to be encompassed by the scope of the present invention.

As illustrated in FIG. 1, the processor 14 may connect to one or more databases 18. The database 18 may be a memory storage device, an IO device such as an MP3 player, a compact disc ("CD") player, a digital video disk ("DVD") player, or any other suitable storage and playback device. To emphasize the breadth of what is meant by the term, the database 18 may include, but is not limited to, any suitable memory on which the CPU 12 relies for its operation. The term database 18 should not be understood to be limited solely to memory devices.

It is noted that the distributed architecture 10 contemplated for use with the side ledge IO node of the present invention also may be connected to other systems and processors on board the aircraft. For example, the distributed architecture 10 may receive input from a flight computer on board the aircraft. These other input devices are not illustrated for simplicity. It is noted, however, that other inputs may be provided to the distributed architecture 10, as should be apparent to those skilled in the art.

The distributed architecture 10 is intended to be specific to the passengers and flight crew on an aircraft. As a result, the CPU 12 is contemplated to connect to at least two IO nodes: (1) a passenger IO node 20 and (2) a crew IO node 22. The passenger IO node 20 receives input and provides output to the passenger. The crew IO node 22 receives input and provides output to members of the flight crew. Both the passenger IO node 20 and the crew IO node 22 connect to the controller 16, through which selected inputs and outputs are directed.

The passenger IO node 20 is contemplated to encompass any suitable input/output device that may be available to a passenger. Similarly, the crew IO node 22 is intended to encompass any suitable input/output device that may be available to a member of the flight crew. In other words, while the present invention will be described in connection with specific devices, the present invention is not intended to be limited thereby. Other devices may be provide or substituted for the devices described herein without departing from the scope of the present invention.

In addition, as will be made more apparent in the discussion that follows, the passenger IO node 20 and the crew IO node 22 are contemplated to provide overlapping functionality. Therefore, the discussion of a particular functionality with respect to one IO node 20, 22 does not preclude the same functionality from being provided via the other of the IO nodes 20, 22.

As illustrated in FIG. 1, the various components of the distributed architecture 10 connect to one another via communication lines 24. The communication lines 24 may be wired or wireless communication lines, as should be apparent to those skilled in the art. Wired communication lines encompass, but are not limited to, wired connections and docking stations (for one or more of the IO nodes). Wireless communication lines may be provided via any suitable data format including, but not limited to, a Bluetooth™ connection (where appropriate).

Additionally, the communication lines are illustrated as two-way communication channels. While depicted as two-way communication channels, it is noted that one-way communication channels may be employed without departing from the scope of the present invention. In addition, it is also contemplated that the communication channels 24 may encompass one or more busses that channel multiple channels of communication along a single communication line 24.

Figure 2:
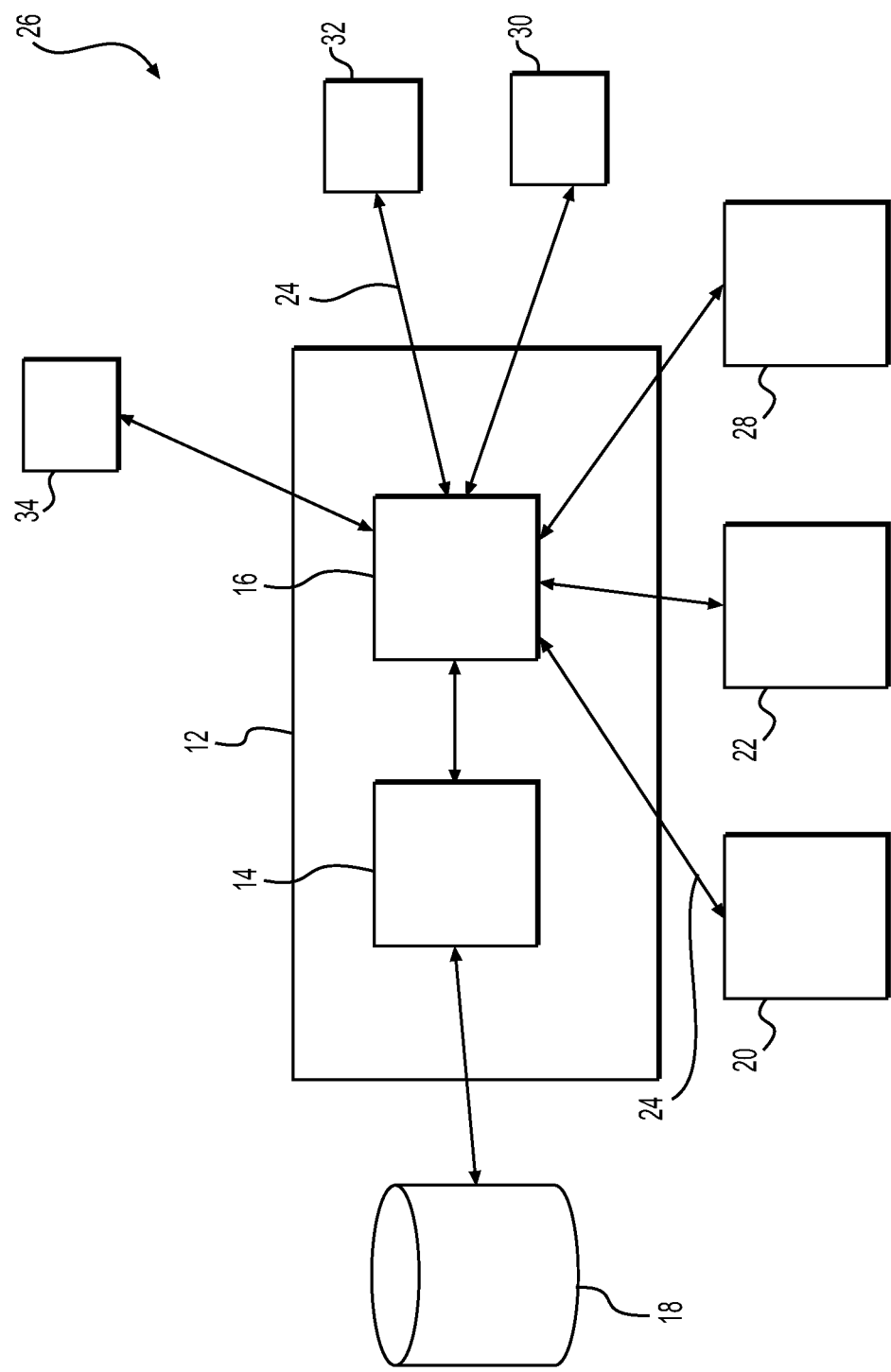
FIG. 2 is a graphical overview of a second embodiment of a distributed architecture with which the side ledge IO node of the present invention is contemplated to cooperate.

FIG. 2 illustrates a second embodiment of a distributed architecture 26 contemplated for use with the bulkhead IO node of the present invention. As will be made apparent from the discussion that follows, the second embodiment of the distributed architecture 26 may be considered as a variation of the first embodiment.

The distributed architecture 26 is directed to a location-oriented approach rather than a person-oriented approach, as detailed in connection with the distributed architecture 10. The person-oriented approach that is employed for the distributed architecture 10 encompasses an architecture where an IO node is associated with an individual, such as a passenger or a member of the flight crew. The location-oriented approach for the distributed architecture 26 encompasses an architecture that relies, at least in part, on IO nodes that are placed at specific locations with the aircraft.

As will be made apparent in discussion that follows, there is an overlap between the first distributed architecture 10 and the second distributed architecture 26.

As illustrated in FIG. 2, the second distributed architecture 26 is similar to the first distributed architecture in that the distributed architecture 26 includes the CPU 12, the processor 14, the controller 16, and the database 18. The second distributed architecture 26 differs from the first distributed architecture 10 in that additional IO nodes are provided at specific locations within the aircraft cabin, as noted above.

As illustrated in FIG. 2, the second distributed architecture is contemplated to include the passenger IO node 20 and the crew IO node 22. In addition, the second distributed architecture 26 includes a bulkhead IO node 28, a side ledge IO node 30, a table IO node 32, and a window IO node 34. Details of the bulkhead IO node 28, the side ledge IO node 30, the table IO node 32, and the window IO node 34 are provided below.

As suggested by the nomenclature employed, the IO nodes 28, 30, 32, 34 are provided at specific locations in the aircraft. The person-specific IO nodes 20, 22 are contemplated to be portable devices that are associated with individuals and, as such, are not associated with any fixed structure within the aircraft.

As illustrated in FIGS. 1 and 2, the IO nodes 20, 22, 28, 30, 32, 34 connect to the controller 16. The controller is contemplated to incorporate a hierarchical command structure that prioritizes input(s) from the different IO nodes 20, 22, 28, 30, 32, 34. For example, the controller 16 may include a hierarchical command structure where input(s) provided by a crew member override (or nullify) input(s) provided by a passenger. In another contemplated scenario, input(s) provided at one of the IO nodes 20, 22, 28, 30, 32, 34 may be given priority over any other input(s). For example, a crew member may have closed the window shades in the aircraft so that the passengers may enjoy in-flight entertainment. A passenger may wish to open his or her window shade via the window IO node 34. So that the passenger may do this, input(s) from the window IO node 34 may be placed at the top of the hierarchical command tree. Still further, the owner or operator of the aircraft may set the hierarchical command structure for the individual aircraft or a fleet of aircraft, as required or as desired.

It is noted that the window IO node 34 and the table IO node 32 are but two examples of nodes where limited space is available for control inputs and/or outputs. The present invention should not be understood to be limited to the nodes 32, 34 that are shown and described herein.

Figure 3:
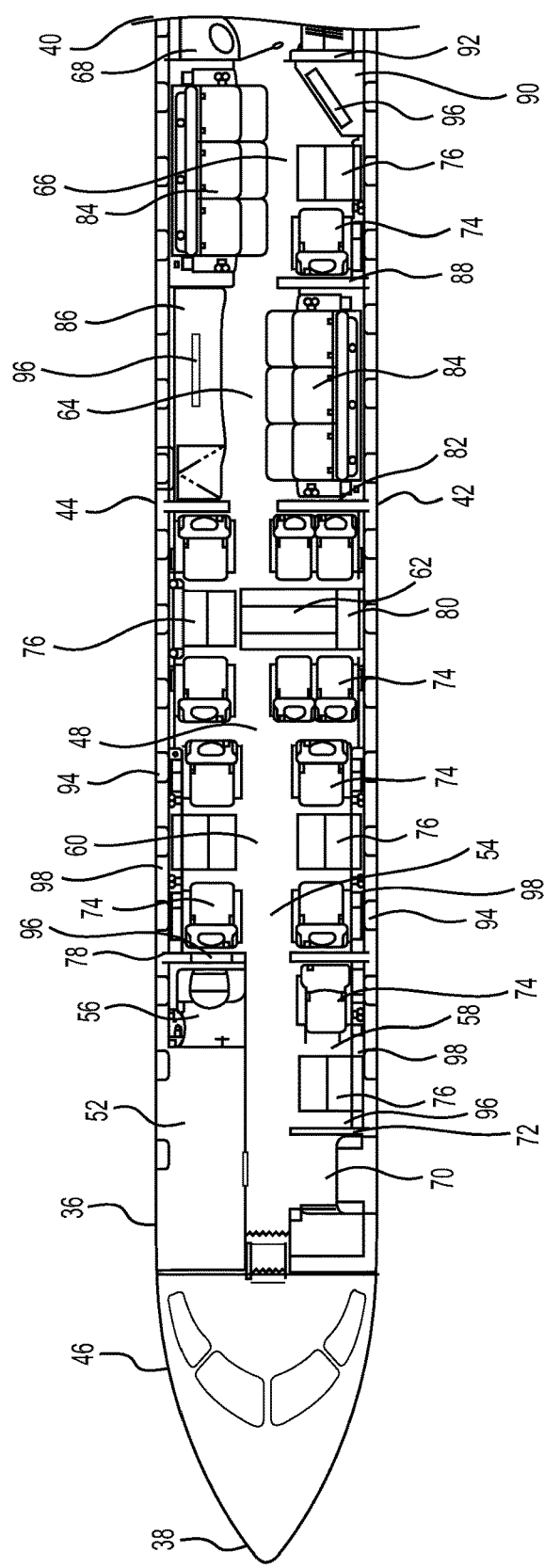
FIG. 3 is a graphical, top view of a portion of an aircraft, depicting one possible configuration for an aircraft cabin that employs the side ledge IO node of the present invention.

To facilitate the discussion of the distributed architectures 10, 26, a top view of an aircraft 36 is illustrated in FIG. 3. The aircraft 36 that is depicted is merely exemplary of the infinite possible configurations that are possible and should not be understood to be limiting of the configurations with which the side ledge IO node 30 of the present invention is contemplated to operate.

As illustrated in FIG. 3, the aircraft 36 has a front end 38, a rear end 40, a left side 42, and a right side 44. The fuselage 46 of the aircraft 36 defines a cabin 48 therein. The layout of the cabin 48 illustrated in FIG. 3 may be provided for a corporate, business, or personal aircraft, such as a private jet.

The cabin 48 includes a cockpit 50, a galley 52, and a passenger area 54. The cabin 48 also includes a forward lavatory 56, a first passenger seating area 58, a second passenger seating area 60, a third passenger seating area 62, a first bedroom 64, a second bedroom 66, and an aft lavatory 68.

The first passenger seating area 58 is positioned adjacent to the galley 52 and the forward lavatory 56. The first passenger seating area 58 is immediately aft of the door 70 that provides ingress into and egress out of the aircraft 36.

A first bulkhead 72 separates the area adjacent to the door 70 from the first passenger seating area 58.

The first passenger seating area 58 is defined by one passenger seat 74 and a stowable table 76. The passenger seat 74 is contemplated to be a reclining seat. However, the passenger seat 74 need not recline. The stowable table 76 is contemplated to be stowable in a side compartment adjacent to the passenger seat 74. As required by applicable aviation laws, the table 76 must be stowed for taxi, take-off, and landing.

It is noted that the first passenger seating area 58 may be reserved for one or more crew members and, therefore, be understood to be a crew seating area 58. Since the type of individual that uses the seating area 58 is not critical to operation of the present invention, the seating area 58 will be referred to herein as the first passenger seating area 58. It is also noted that, while other seating areas are indicated as being for passengers, crew members may use these areas together with the passengers.

A second bulkhead 78 separates the first passenger seating area 58 and forward lavatory 56 from the second passenger seating area 60.

The second passenger seating area 60 includes four passenger seats 74 that are positioned on opposite sides of a central aisle. Two seats 74 face one another across a table 76 on the right side 44 of the aircraft 36. Similarly, two seats 74 face one another across a stowable table 76 on the left side 42 of the aircraft.

The third passenger seating area 62 is defined by six passenger seats 74, a stowable table 76, and a stowable conference table 80. Two seats 74 face one another across the stowable table 76 on the right ride 44 of the aircraft 36. Four seats 74 face one another (in two pairs) across a stowable conference table 78. As illustrated, when the tables 76, 80 are deployed, they are contemplated to form a single conference table that extends across the width of the cabin 48.

As is apparent from FIG. 3, the second seating area 60 and the third seating area 62 are not separated from one another by any bulkhead or other barrier. Instead, these passenger areas 58, 60 are contemplated to form a continuous passenger area within the cabin 48.

The first bedroom 64 is separated from the third passenger seating area 62 by a third bulkhead 82. The first bedroom 64 includes a divan 84 on the left side 42 of the aircraft 36 and a cabinet 86, such as a media cabinet, on the right side 44 of the cabin 48. It is contemplated that the divan 84 will function both as a couch (or a sofa) and a bed, depending upon its use or configuration.

The second bedroom 66 is separated from the first bedroom 64 by a fourth bulkhead 88. The second bedroom 66 includes a divan 84 on the right side 44 of the aircraft 36. A seat 74 and stowable table 76 are provided on the left side 42 of aircraft 36. Also on the left side 42 is a cabinet 90, which may be provided with a media center, including a monitor or a television.

A fifth bulkhead 92 separates the second bedroom 66 from the rear lavatory 68.

It is noted that the fuselage 46 includes a plurality of windows 94.

In addition, at least four monitors 96 (i.e., video output screens) are provided in the aircraft 36 at various locations. The monitors 96 are contemplated to be positioned to provide video information and entertainment to the passengers in the aircraft 36. It is contemplated that entertainment also may be provided to the passengers via entertainment devices that are associated with the passenger seats 74.

As illustrated, the cabin 48 also includes several side ledges 98 that extend along the length of selected ones of the passenger seating areas 58, 60, 62. Where they are provided, the side ledges 98 are disposed between the passenger seat 74 and the wall of the fuselage 46. As is apparent from FIG. 3, the side ledges 98 are provided in the first passenger seating area 58 and the second passenger seating area 60. While side ledges 98 are not illustrated for the third passenger seating area 62, side ledges 98 may be provided in this seating area without departing from the scope of the present invention.

It is noted that the term "side ledge" is intended to encompass other furniture within the cabin 48 of the aircraft 36 in addition to the typical side ledge 98 that is identified in FIG. 3. Specifically, a cabinet or side ledge 98 may be provided adjacent to the divan 84 in the aircraft 36. While such a side ledge 98 would extend transversely to the travel direction of the aircraft 36, the side ledge 98 may be provided with control functionality. In addition, if the aircraft 36 were to include a bed with night stands, the night stands would be considered as side ledges 98 for purposes of the present invention.

As should be apparent to those skilled in the art, the configuration for the cabin 48 of the aircraft 36 that is provided in FIG. 3 is merely exemplary of the many possible configurations that may be employed in the cabin 48 of the aircraft 36. In other words, the present invention should not be understood to be limited to use on aircraft 36 with the configuration depicted in FIG. 3.

With renewed reference to the distributed architectures 10, 26, either architecture 10, 26 (or any variant thereof) may be employed onboard the aircraft 36. For purposes of the discussion herein, the aircraft 36 includes the second distributed architecture 26.

In this architecture, the passenger IO node 20 is contemplated to be a mobile electronic device, as discussed above. Mobile electronic devices include, but are not limited to, portable computers, tablets, and smartphones. As will be made apparent from the discussion that follows, it is contemplated that the passenger IO node 20 will be capable of receiving and storing a software program, such as an "app." The app may be specific to a particular aircraft or airline, as required or desired. The app is contemplated to provide the software needed for proper interface with the controller 16 for operation of the distributed architecture 26. In other words, the software resident on the passenger IO node 20 is contemplated to be configured to provide input to the CPU 12 and to receive output from the CPU 12.

The crew IO node 22 also is contemplated to be a mobile device, such as a portable computer, tablet, or smartphone. As with the passenger IO node 20, the crew IO node 22 is contemplated to be provided with a suitable app (or resident software) for interface with the CPU 12.

Where the mobile IO nodes 20, 22 are tablets (or other suitable electronic devices), it is contemplated that the tablets 20, 22 will be provided with the delivery to the customer of the aircraft 36. In this embodiment, when a passenger boards the aircraft 36, the passenger will be assigned one of the mobile devices for use during the flight.

Alternatively, it is contemplated that a passenger may bring his or her own mobile device on board the aircraft 36. If so, the passenger (and/or crew member) may be prompted to download suitable software (i.e., the app) for interface with the controller 16 prior to boarding the aircraft. In a further contemplated embodiment, the passenger (and/or crew member) may be prompted to download suitable software after boarding the aircraft, for example.

As also discussed above, the aircraft 36 may include additional IO nodes.

One of the additional IO nodes is the side ledge IO node 30, which is the focus of the present invention. The side ledge IO node 30 is contemplated to be incorporated into the side ledges 98 at fixed locations adjacent to the passenger seats 74. As will be made apparent from the discussion that follows, the side ledge IO node 30 provides access to several of the functions that are controllable within the cabin 48.

Before providing additional details regarding the side ledge IO node 30, it is noted that the side ledge IO node 30 need not cooperate with the distributed architectures 10, 26. It is contemplated, as an aspect of the present invention, that the side ledge IO node 30 may be provided as a separate control within the cabin 48 of the aircraft 36. In other words, the side ledge IO node 30 may be an additional, independent control device that is incorporated into the cabin 48 of the aircraft 36 and that operates independently from any distributed architecture 10, 26.

Figure 4:
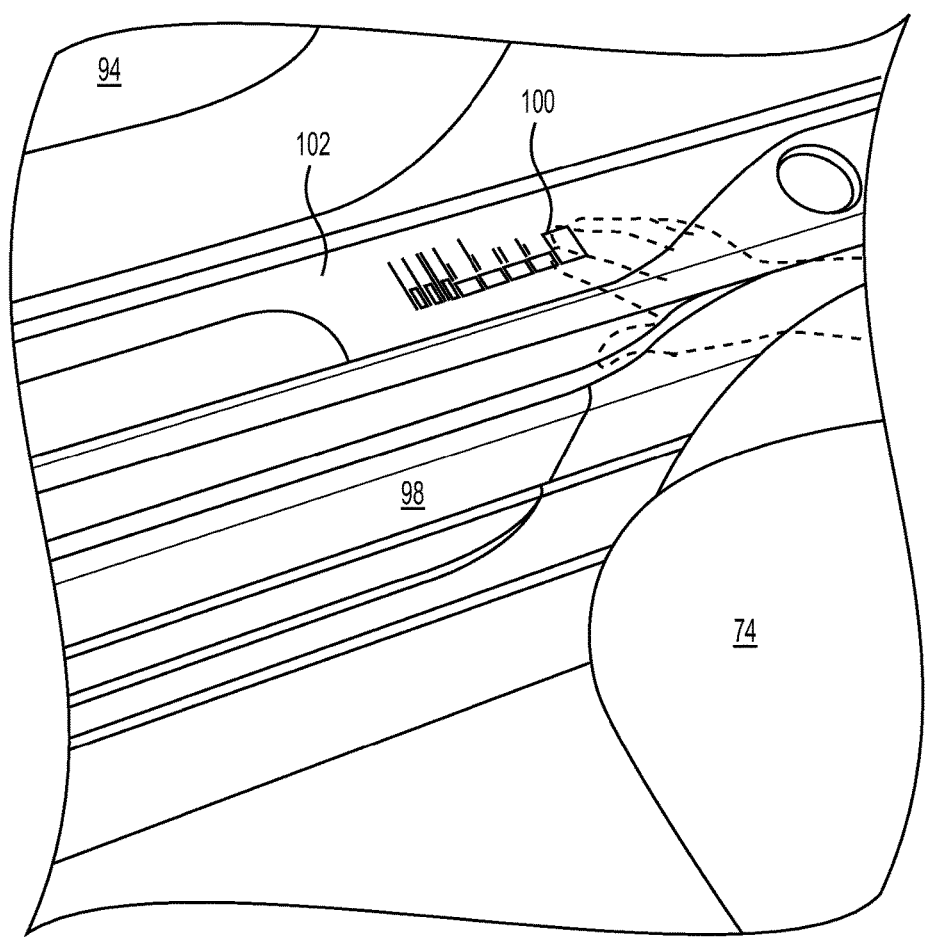
FIG. 4 is a perspective illustration of one embodiment of the side ledge IO node of the present invention.

FIG. 4 is a perspective illustration of one embodiment of a side ledge IO node 100 according to the present invention. The side ledge IO node 100 is designed as a tablet that is mounted into the side ledge 98, adjacent to a passenger's seat 74. The side ledge IO node 100 is contemplated to be a touch-sensitive device that is integrated into the top surface 102 of the side ledge 98. The side ledge IO node 100 provides an interactive interface so that a passenger may easily access and control both environmental functions within the cabin 48 of the aircraft 36. The passenger may access the side ledge IO node 100 to control functions related to environment, entertainment, and personal comfort.

It is noted that the term "user" is employed to refer to passengers and flight crew members, since both categories of persons are contemplated to be users of the present invention. As such, where the terms "passenger" or "flight crew member" are used, the term is not intended to exclude use by any other user, as required or as desired.

Figure 5:
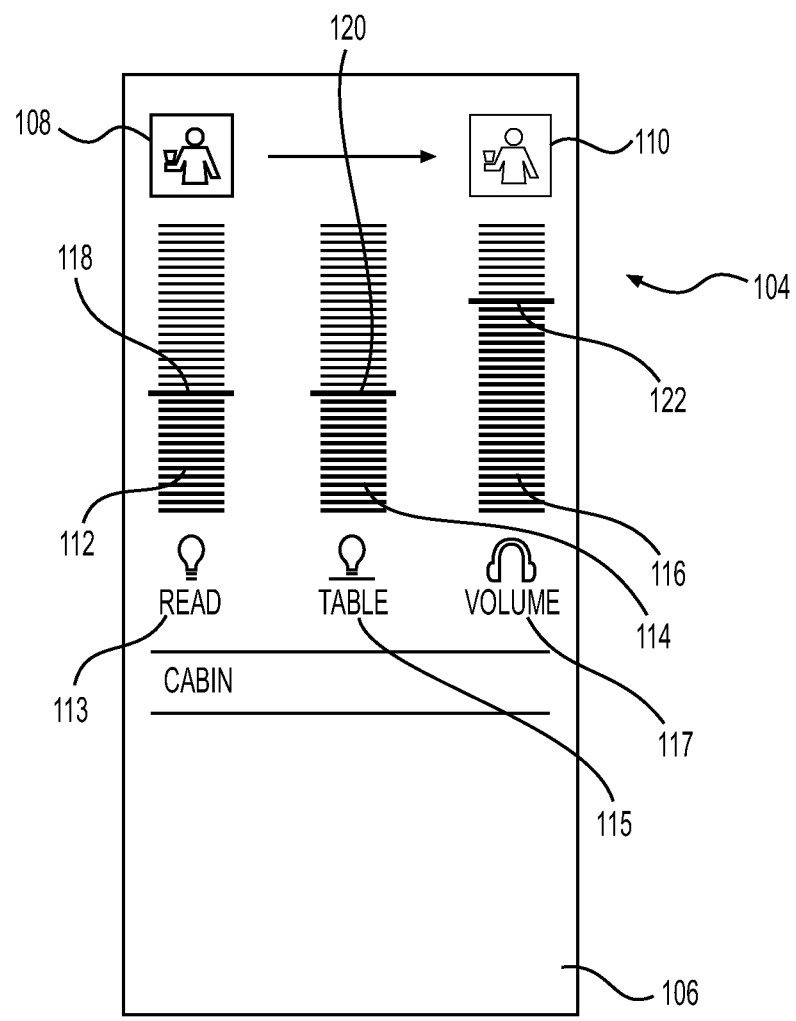
FIG. 5 is a top view of a first display for the side ledge IO node illustrated in FIG. 4.

FIG. 5 is a graphical representation of one contemplated GUI that may be displayed by the side ledge IO node 30. This GUI is referred to as the cabin GUI 104, because the GUI provides control over at least some of the functions within the cabin 48.

The cabin GUI 104 defines a display area 106. The display area 106 provides access to four functions in this illustrated embodiment. First, the display area 106 includes an attendant call button 108. The display 106 also includes a button to cancel the flight attendant call 110. As noted, the surface of the side ledge IO node 30 is contemplated to be touch-sensitive. As a result, a user need only tap on the portion of the display area 106 containing the control display elements to access control over the functions displayed.

As also illustrated in FIG. 5, the display area 106 includes three control bars: (1) a reading light control bar 112, (2) a table light control bar 114, and (3) a volume control bar 116.

The reading light control bar 112 includes a reading light slider 118, designated by a reading light icon 113, that indicates an intensity of the overhead reading light. By sliding his or her fingers along the reading light control bar 112 and moving the slider 118, the user generates input that is used to control the intensity of the overhead reading light. The intensity may be between 0% and 100%, for example. It is also contemplated that the reading light slider 118 may operate between pre-set maxima and minima other than 0% and 100% intensity. Alternatively, the light intensity may be displayed in any other suitable format, such as "watts" or "lumens."

The reading light color control bar 112 also may include a slider 118 that may be moved between two different color selections for the overhead cabin lights. One end of the scale may be a color of the light commonly referred to as "cool" light. The other end may be a color referred to as "warm" light. Cool light typically includes a greater intensity of blue hues, while warm light typically includes more yellow light. With respect to the warmness (i.e., the yellow or amber content) or coolness (i.e., the blue content) of the light, it is contemplated that the user will adjust the color of the light between two standard colors for the light. As should be apparent, the colors may be set according to standards for lighting or they may be selected by the aircraft owner or user, as appropriate.

In a further mode of operation, it is contemplated that control may be provided over the red, green, and blue ("RGB") color components of the light. This is particularly possible in instances where the lighting is provided by light emitting diodes ("LEDs"). If so, it is contemplated that control bars and sliders may be provided for each of the RGB values and that the user may control each of the RGB values independently from one another. The scale of the RGB values may be between 0% and 100% saturation, as should be apparent to those skilled in the art.

Similarly, the table light control bar 114 includes a table light slider 120, which is designated by a table light icon 115. The table light slider 120 may be manipulated by the user to alter the intensity of a light above a table 76 or a conference table 80. By sliding his or her fingers along the table light control bar 114 and moving the slider 120, the user generates input that is used to control the intensity of the overhead table light. The intensity may be between 0% and 100%, for example. It is also contemplated that the table light slider 120 may operate between pre-set maxima and minima other than 0% and 100% intensity, just as in the case with the reading light. As noted above, the light intensity may be displayed in any other suitable format, such as "watts" or "lumens."

The light color control bar 114 also may include a slider 120 that may be moved between two different color selections for the overhead cabin lights. One end of the scale may be a color of the light commonly referred to as "cool" light. The other end may be a color referred to as "warm" light. Cool light typically includes a greater intensity of blue hues, while warm light typically includes more yellow light.

In a further mode of operation, it is contemplated that control may be provided over the red, green, and blue ("RGB") color components of the light. This is particularly possible in instances where the lighting is provided by light emitting diodes ("LEDs"). If so, it is contemplated that control bars and sliders may be provided for each of the RGB values and that the user may control each of the RGB values independently from one another. The scale of the RGB values may be between 0% and 100% saturation, as should be apparent to those skilled in the art.

The display area 106 also includes a volume control bar 116, which is designated by a volume icon 117. The volume control bar 116 includes a volume control slider 122 that may be manipulated to adjust the volume of media being played to the user. The volume control slider 122 may adjust the volume between a minimum where no sound may be heard to a predetermined maximum.

Figure 6:
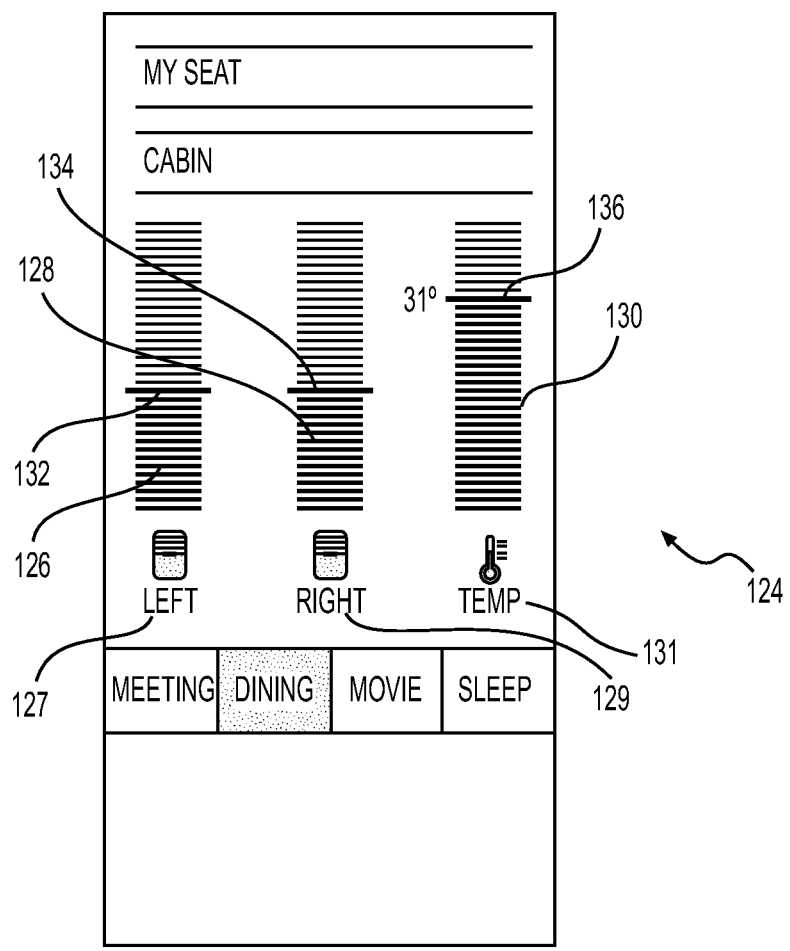
FIG. 6 is a top view of a second display for the side ledge IO node illustrated in FIG. 4.

FIG. 6 is graphical representation of an environment GUI display 124 contemplated for use with the side ledge IO node 100. The environment GUI display 124 may be accessed through a top level menu (not shown). Alternatively, the environment GUI display 124 may be accessed by swiping in a predetermined direction after accessing the cabin GUI 104.

The environment GUI display 124 includes three control bars: (1) a left side cabin window shade controller 126, (2) a right side cabin window shade controller 128, and (3) a temperature controller 130. The left side window shade controller 126, indicated by the left shade icon 127, includes a left shade slider 132 that may be adjusted to alter the degree to which the window shades are open on the left side 42 of the aircraft 36. The right window shade controller 128, designated by the right shade icon 129, includes a slider 134 that permits adjustment of the degree to which the window shades on the right side 44 of the aircraft 36 may be open. As should be apparent, it is contemplated that the window shades will be positionable from a fully closed orientation to a fully opened orientation. The temperature controller 130, which is designated by a temperature icon 131, includes a temperature slider 136 that permits adjustment of the temperature within the cabin 48 of the aircraft 36. The temperature range that is controllable by the user may be set to remain within a predetermined minimum and maximum, for passenger comfort and safety.

It is noted that the window shade controllers 126, 128 and the temperature controller 130 may adjust associated parameters within selected zones within the aircraft 36. For example, control may be provided for the window shades and temperature within the first bedroom 62 without affecting any other area within the cabin 48.

Figure 7:
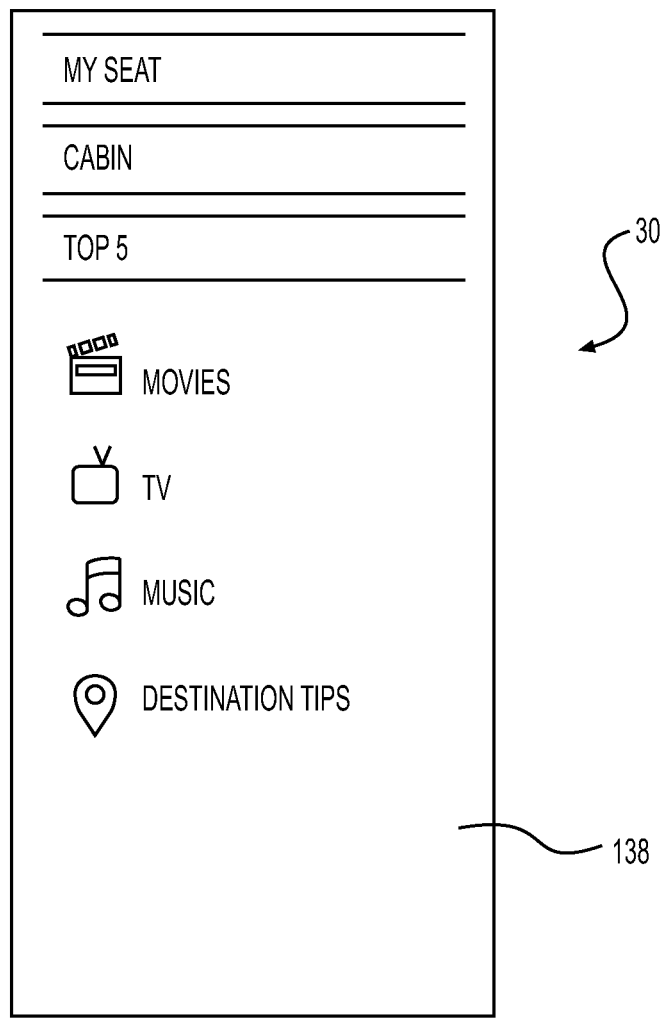
FIG. 7 is a top view of a third display for the side ledge IO node illustrated in FIG. 5.

FIG. 7 is a graphical representation of a media menu GUI display 138 that is contemplated for use with the side ledge IO node 100. The media menu GUI display 138 permits a user to access one or more sub-menus, which provide audio and video entertainment to the user. As indicated, there are at least four entertainment categories: (1) music, (2) TV, (3) movies, and (4) destination tips. The music, TV, and movie areas on the media menu GUI display 138 provide access to various media that are available on the aircraft 36. The destination tips category is contemplated to be an interactive tool to provide the user with requested information about the user's destination. Such information may include restaurant listings and other information pertinent to a visitor to that geographic location, for example.

Figure 8:
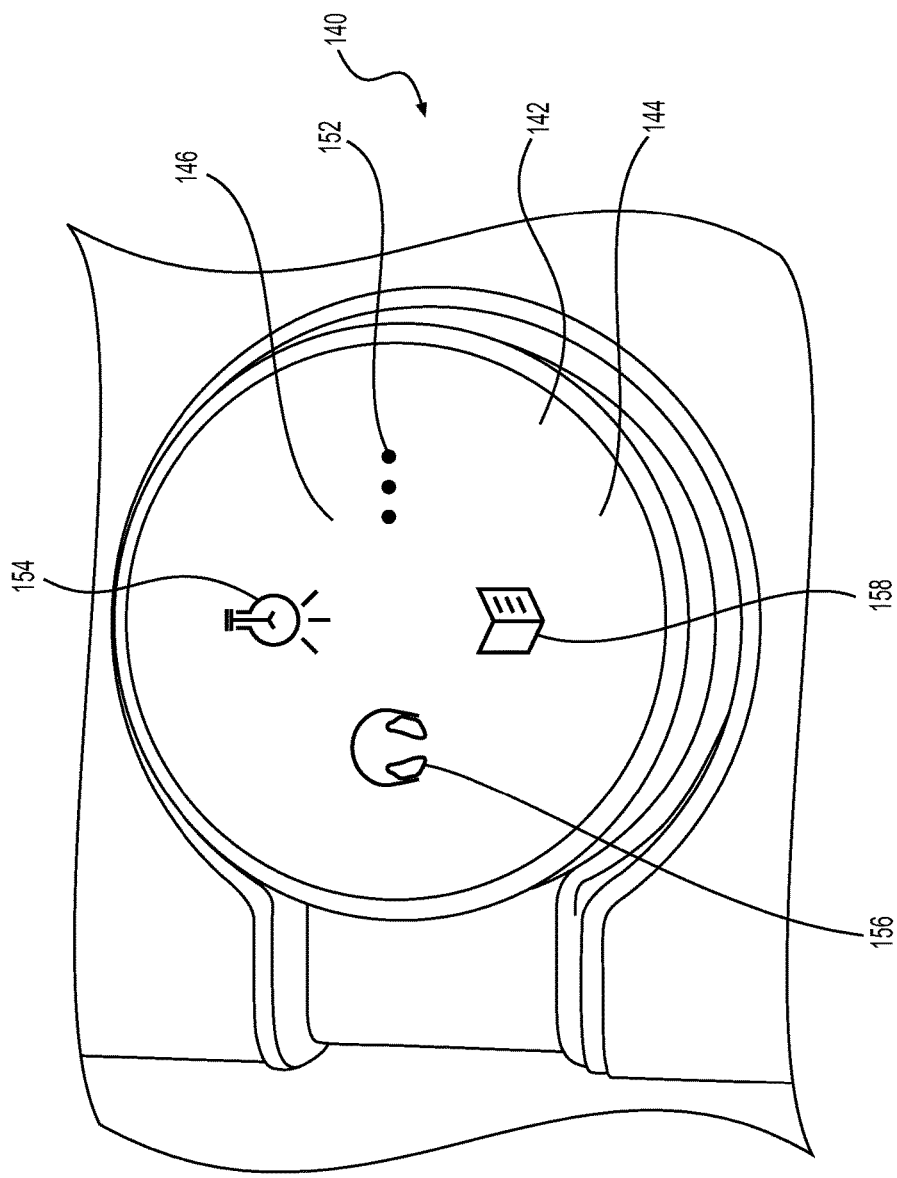
FIG. 8 is a second contemplated embodiment of the side ledge IO node of the present invention.

FIG. 8 is a top view of a second embodiment of a side ledge IO node 140 according to the present invention. The side ledge IO node 140 is designed to include a knob 142 with a top surface 144 having a display 146 disposed therein. The display 146 is contemplated to present different images and icons depending upon the operation selected by the user, as discussed in greater detail below.

Concerning the knob 142, it is noted that the term "knob" is not intended to be limiting of the present invention. The knob 142 may be a dial, a joystick, a rotary controller, etc., without departing from the scope of the present invention.

Figure 9:
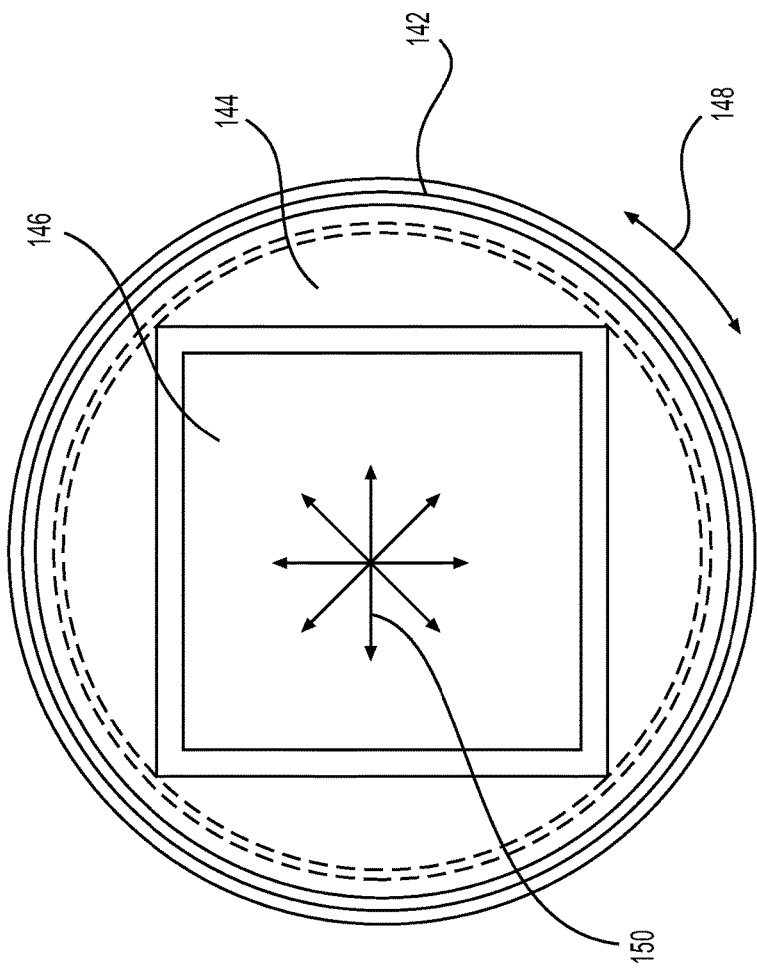
FIG. 9 is a graphical, top view of the side ledge IO node illustrated in FIG. 8.

FIG. 9 is a top, plan view of the knob 142 illustrated in FIG. 8. The knob 142 includes a top surface 144 that encompasses a display 146. The display 146 is a touch-sensitive display that receives input consistent with one or more menu items shown on the display 146. While it is contemplated that the display 146 will incorporate a luminescent, flat-panel screen, any suitable screen may be employed without departing from the scope of the present invention.

As may be apparent, the side ledge IO node 140 is intended to combine the convenience associated with touch-responsive menus together with the tactile responsiveness of a dial. The knob 142 is rotatable in the direction of the arrows 148. In an alternative embodiment, it is contemplated that the knob 142 may be tiltable, like a joystick in any direction, as indicated by the arrows 150.

Returning to FIG. 8, the knob 142 is illustrated with four icons illuminating the display 146: (1) an additional menu items icon 152, (2) a table lighting icon 154, (3) a media icon 156, and (4) a reading light icon 158. As should be apparent, the content of the display 146 represents one of several possible icon configurations that may be presented to the user.

It is noted that the surface 144 of the display 146 may be activated using one or more techniques. In a first contemplated mode of operation, the user need only tap, with his or her fingers, on the selected icon to access the menu associated with that icon. In a second contemplated embodiment, the user may use a swiping motion on the surface 144 of the display 146 to access the menu associated with the desired icon.

Alternatively, the knob 142 may be used to access a particular menu. For example, the user may turn the knob 142 to highlight the desired icon. Once highlighted, the user may access the menu associated with the highlighted icon by tapping or swiping on the surface 144 of the knob 142. In still another contemplated embodiment, the user may toggle the knob in the direction of the icon to access the menu associated with that icon. Other contemplated embodiments for the operation of the display and the knob 142 involve combinations of tapping, swiping, toggling, and turning the knob 142.

Figure 10:
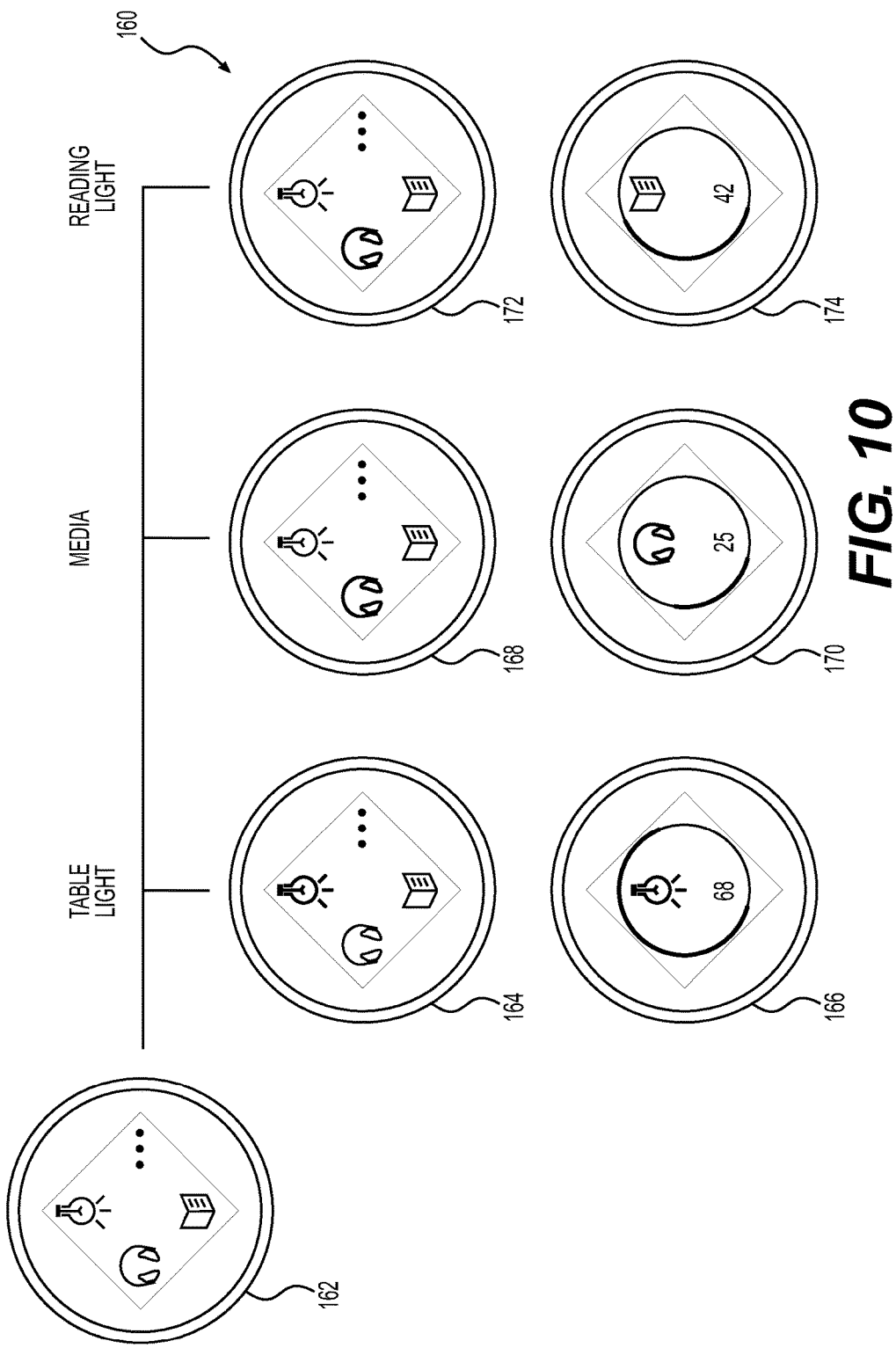
FIG. 10 is a graphical depiction of a first menu tree, illustrating one part of the method of operation of the side ledge IO node illustrated in FIG. 8.

From the options menu 162 displayed by the display 146, the user is able to access options though an options menu tree 160, which is illustrated in FIG. 10. The options menu 162 is the same menu illustrated in FIG. 8 on the display 146 of the knob 142.

As noted above, the user may select one of four icons 152, 154, 156, 158, each of which provides access to further menu selections. The menu tree 160 depicts the submenus that are contemplated to appear, if the user selects one of the table lighting icon 154, the media icon 156, or the reading light icon 158.

If the user selects the table lighting icon 154, the table lighting icon 154 is highlighted as shown in the first highlighted options menu 164. As noted above, the table light is contemplated to be provided over the table 76 or the conference table 80. Once highlighted, the user may access the light intensity menu 166. Once the light intensity menu 166 is made available to the user, the user may rotate the knob 142, thereby altering the brightness of the table light to a desirable intensity. The display 146 provides an indication of the degree of brightness between, e.g., 0 lumens and a maximum intensity, to the user. In FIG. 10, the brightness is illustrated as having been adjusted to 68% of the maximum.

If the user selects the media icon 156, the menu icon 156 is highlighted as shown in the second highlighted options menu 168. Once highlighted, the user may access the volume intensity menu 170. The user may adjust the volume of media being played by rotating the knob 142, thereby increasing or decreasing the volume. The volume is contemplated to be adjustable between a minimum level, such as 0 dB, and a maximum predetermined loudness. Alternatively, the volume may be adjustable between 0% and 100% of a maximum value. In FIG. 10, the volume is shown as having been adjusted to 25% of maximum.

If the user selects the reading light icon 158, the reading light icon 158 is highlighted, as illustrated in the third highlighted options menu 172. Once highlighted, the user may access the reading light intensity menu 174. Using the knob 142, the user may adjust the intensity of the reading light. Adjustment of the brightness of the reading light may be between 0 lumens and a maximum value. Alternatively, the brightness may be adjusted between 0% and 100% of a maximum value. In FIG. 10, the brightness is shown as having been adjusted to 42% of maximum.

Figure 11:
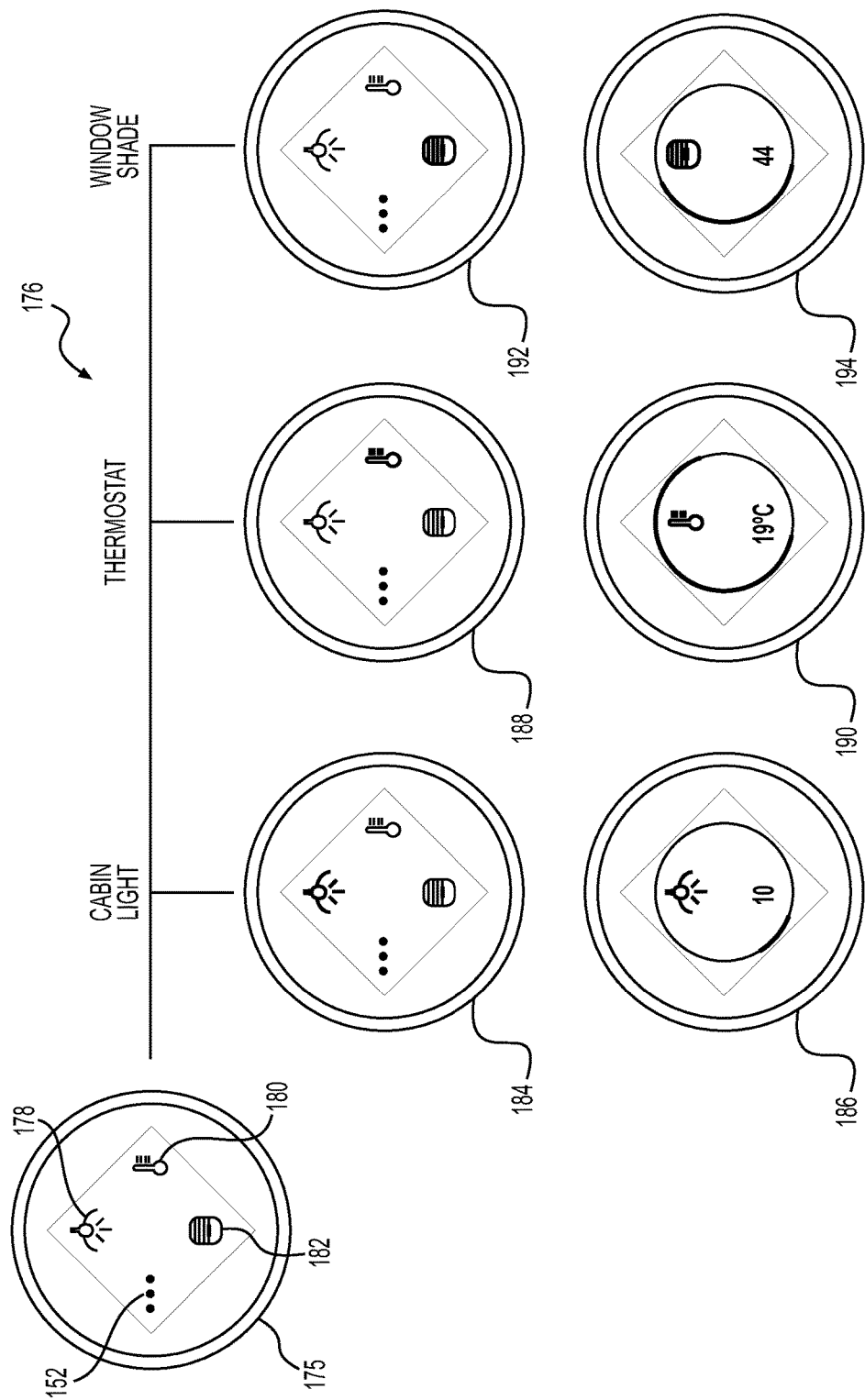
FIG. 11 is a graphical depiction of a second menu tree, illustrating another part of the method of operation of the side ledge IO node illustrated in FIG. 8.

If the user selects the additional menu items icon 152, the display 146 transitions to the additional items menu 174, which provides access to the additional items menu tree 176 that is illustrated in FIG. 11. The additional items menu tree 176 includes four icons: (1) the additional menu items icon 152, (2) a cabin lighting icon 178, (3) a thermostat icon 180, and (4) a window shade icon 182. As should be apparent, the content of the display 146 showing the additional items menu 175 represents one of several possible icon configurations that may be presented to the user.

If the user selects the cabin lighting icon 178, the cabin lighting icon 178 is highlighted as shown in the fourth highlighted options menu 184. Once highlighted, the user may access the cabin light intensity menu 186. The user may adjust the intensity of the cabin lights by rotating the knob 142, thereby increasing or decreasing the brightness of the cabin lights. The light intensity is contemplated to be adjustable between a minimum level, such as 0 lumens, and a maximum predetermined brightness. Alternatively, the brightness may be adjusted to a value between 0% and 100% of a maximum value. In FIG. 11, the brightness is shown as having been adjusted to 10% of maximum.

If the user selects the thermostat icon 180, the thermostat icon 180 is highlighted as shown in the fifth highlighted options menu 188. Once highlighted, the user may access the temperature menu 190. The user may adjust the temperature by rotating the knob 142, thereby increasing or decreasing the temperature in the cabin 48. The temperature is contemplated to be adjustable between a minimum level, such as 15° C. and a maximum temperature, such as 35° C. In FIG. 11, the temperature is shown as having been adjusted to 19° C.

If the user selects the window shade icon 182, the window shade icon 182 is highlighted as shown in the sixth highlighted options menu 192. Once highlighted, the user may access the window shade menu 194. The user may adjust the degree of openness of the window shades in the cabin 46 by rotating the knob 142, thereby opening or closing the window shades. The degree to which the window shades are open is contemplated to be adjustable between a minimum level, such as fully closed, and a maximum level, such as completely open. In FIG. 11, the window shade is indicated as having been opened to 44% of maximum.

With respect to the window shades, it is noted that the window shades may be of any particular type without departing from the scope of the present invention. For example, the window shades may be made from a sheet of material that moves (via a motor, for example) in front of the window to block the transmission of light therethrough. Alternatively, the window shades may be made from an electrochromic material. Electrochromic materials respond to signals by altering their color and/or opacity.

Figure 12:
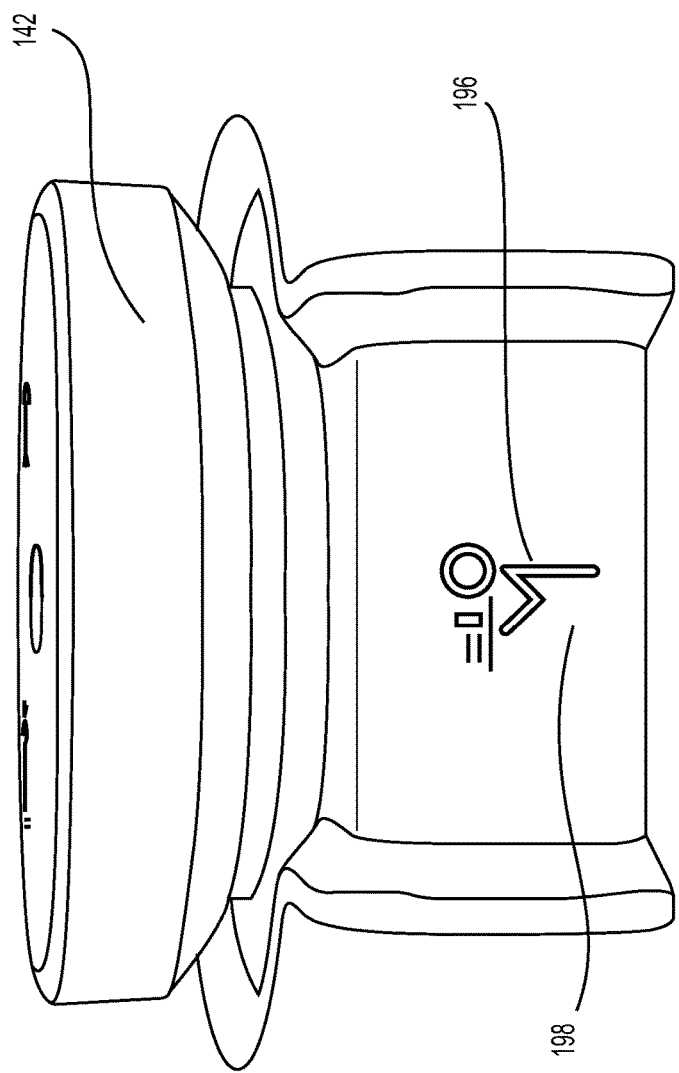
FIG. 12 is a front view of the side ledge IO node illustrated in FIG. 8.

FIG. 12 is a side view of the knob 142. At the edge of the side ledge 98, an attendant call button 196 is located. The attendant call button 196 is contemplated to be touch-sensitive. The attendant call icon 198 is shown in FIG. 12. Alternatively, the attendant call button may be a push button switch (or other type of switch) without departing from the scope of the present invention.

Figure 13:
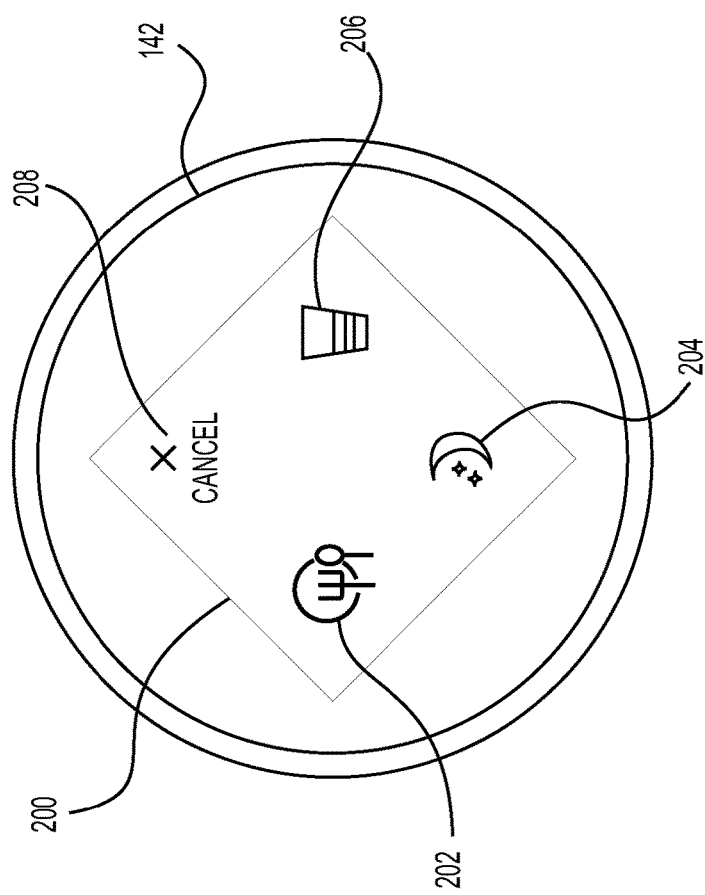
FIG. 13 is a top view of display for the side ledge IO node illustrated in FIG. 8.

When the user touches the attendant call button 196, the user accesses the attendant call menu 200, which is illustrated in FIG. 13. The attendant call menu 200 appears on the display 146 and shows four icons: (1) a meal icon 202, (2) a sleep icon 204, (3) a drink icon 206, and (4) a cancel icon 208.

The meal icon 202, when selected, sends a request to the flight attendant to bring a meal to the user or to take a meal order from the user.

The sleep icon 204, when selected, provides a signal to the flight attendant that the user would like to get some sleep. In response, the flight attendant may bring the user a pillow and blanket and assist the passenger to recline the seat 74 to a fully reclined position. In addition, the sleep icon 204 may close all of the window shades in the immediate vicinity of the user.

The drink icon 206, when tapped, provides a notification to the flight attendant that the user would like a drink. This icon also may provide a signal to the flight attendant to take a drink order from the user.

The cancel icon 208 permits the user to cancel any request of the flight attendant that may have been made via the remaining three icons.

As may be apparent from FIG. 12, the attendant call button 196 is positioned adjacent to the knob 142 so that a person may activate the knob 142 and attendant call button 196 in tandem. For example, a passenger may activate the attendant call button 196 with his or her thumb. The passenger may then rotate the knob 142, with his or her fingers, to select one of the four icons 202, 204, 206, 208.

Figure 14:
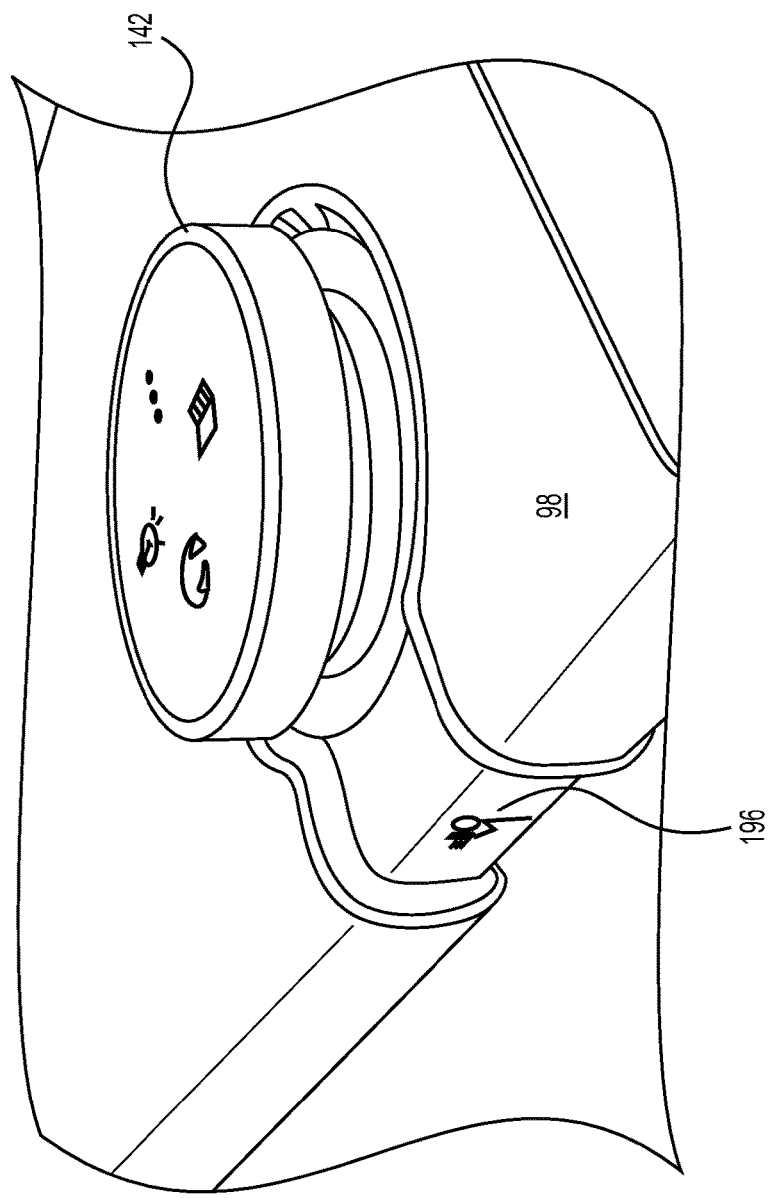
FIG. 14 is a perspective illustration of the side ledge IO node illustrated in FIG. 8.

FIG. 14 illustrates the knob 142 from a perspective view. The knob 142 is illustrated in the active mode of operation. In the active mode of operation, the surface of the knob 142 is at a height above that of the surrounding surface, facilitating rotation of the knob by the user. In this case, the surrounding surface is the top surface of the side ledge 98.

Figure 15:
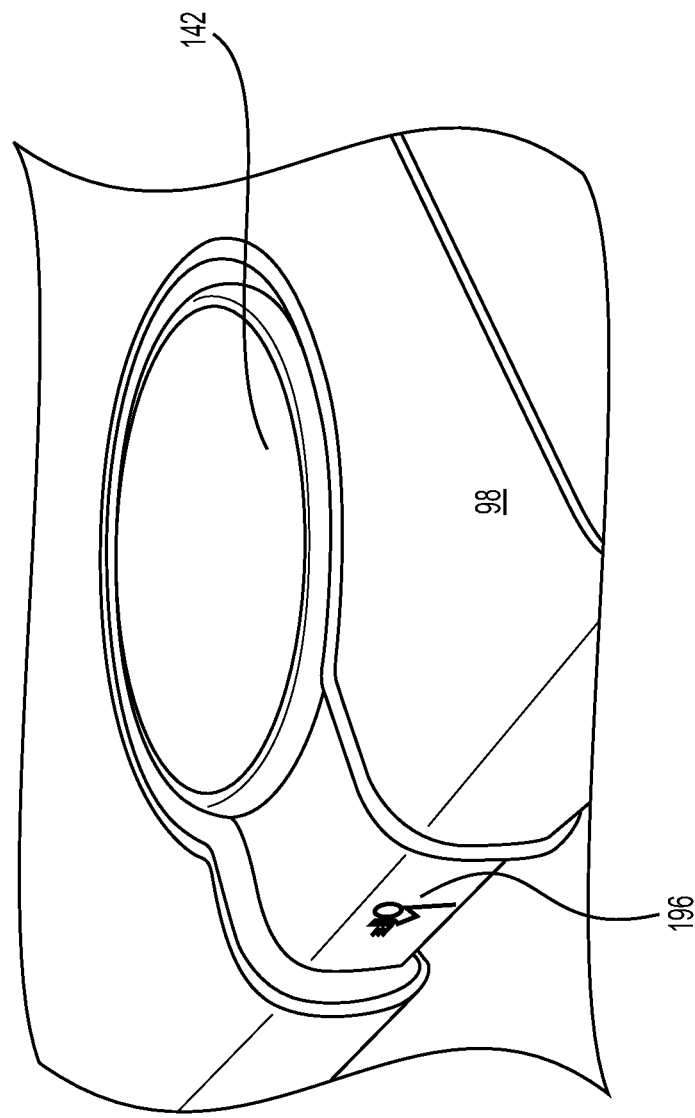
FIG. 15 is a perspective illustration of the side ledge IO node illustrated in FIG. 14, showing the side ledge IO node in a retracted condition.

FIG. 15 is a perspective view of the knob 142 in a sleep mode of operation. In this mode of operation, the knob 142 is retracted into the top surface of the side ledge 98. In the sleep mode of operation, the top surface of the knob 142 is contemplated to be substantially coplanar with the surface of the surrounding surface. In other words, the top surface of the knob 142 is contemplated to be flush, or substantially flush, with the surrounding surface. In this case, the surrounding surface if the top surface of the side ledge 98.

It is contemplated that the knob 142 may be awakened from the sleep mode in one of two ways.

In a first contemplated mode of operation, the knob 142 may be pressure-activated. In this first mode of operation, it is contemplated that the knob 142 will be spring-loaded. As such, when a user presses on the top of the knob 142 while in the retracted state, the knob 142 will deploy from the side ledge, by extending upwardly from the surface of the side ledge 98. The user may return the knob 142 to a retracted position by pressing on the knob 142 until the knob 142 is retained at a height substantially the same as the surface of the surrounding side ledge 98.

In the second contemplated embodiment, the knob 142 may be deployed from the side ledge 98 via a suitable motor (or other powered device). In this second embodiment, the knob 142 is contemplated to respond to touch from the user. Once touched, the knob 142 deploys from the surface of the side ledge 98. In this embodiment, it is contemplated that the user may return the knob 142 into a retracted by touching the knob 142 a second time or in a particular manner. Separately, it is contemplated that, if the knob 142 is not touched by a user for more than a predetermined period of time (i.e., two minutes or longer) the knob 142 will automatically retract and enter a sleep mode of operation until activated again.

Figure 16:
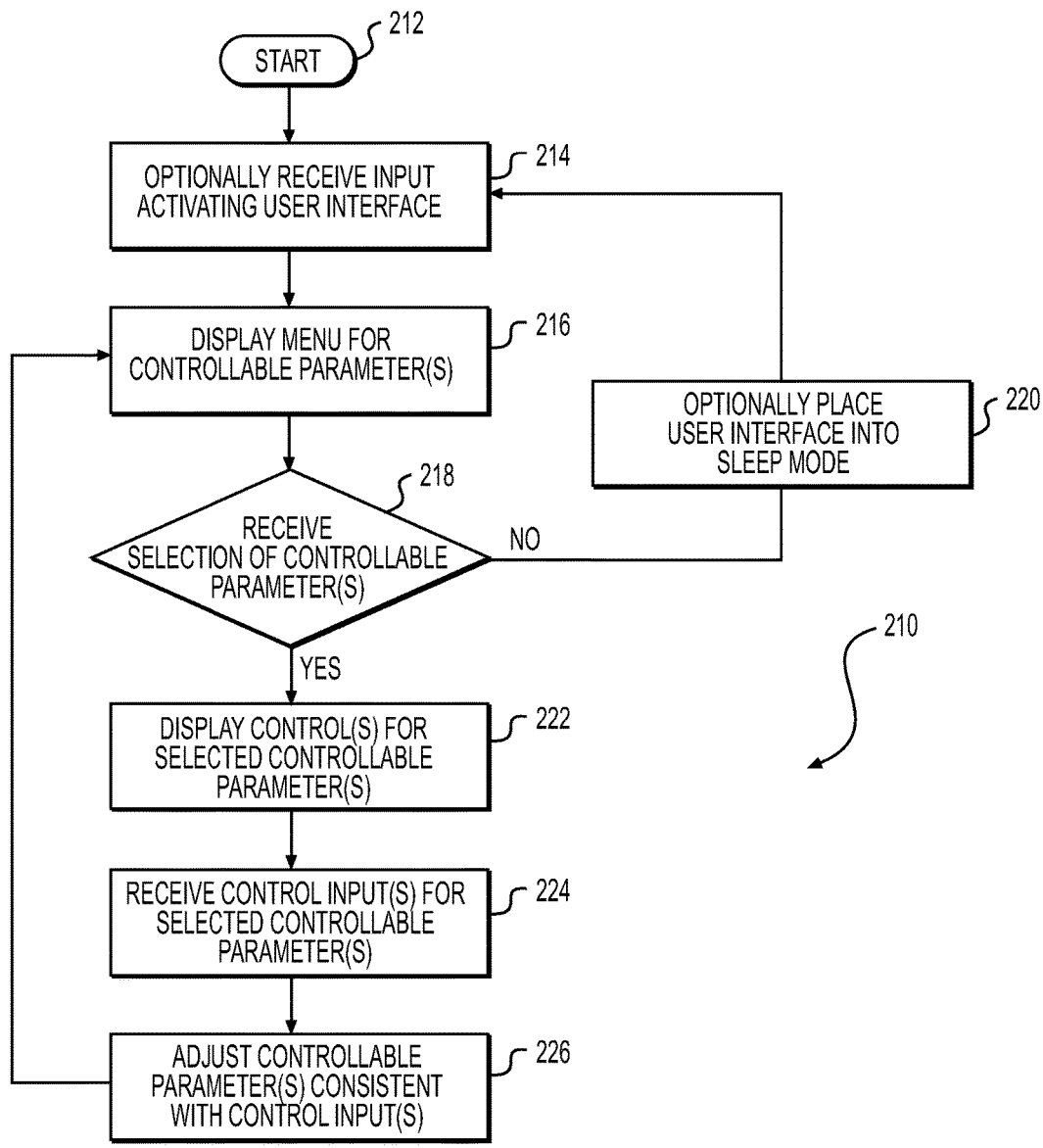
FIG. 16 is a flow chart illustrating a first contemplated method of operation of the side ledge IO node of the present invention.
Figure 17:
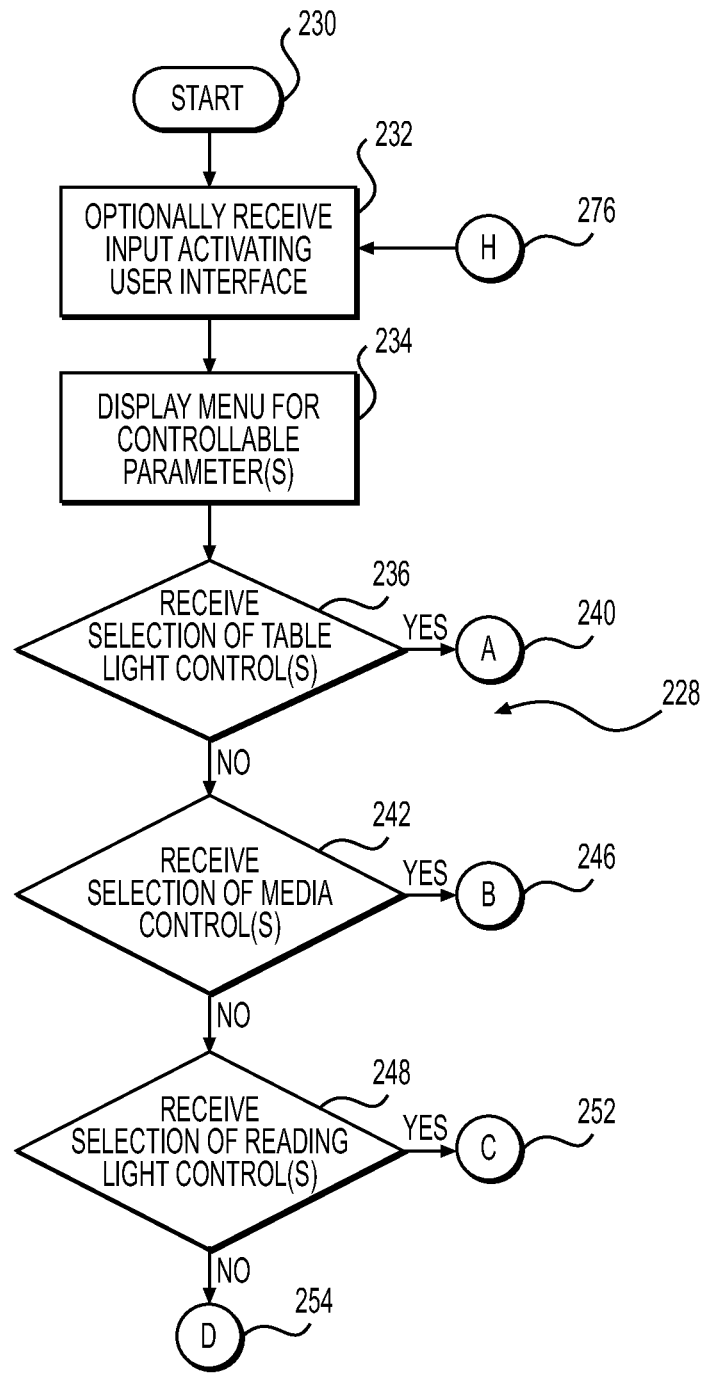
FIGS. 17-24 are flow charts that collectively illustrate a second contemplated method of operation of the side ledge IO node of the present invention.
Figure 18:
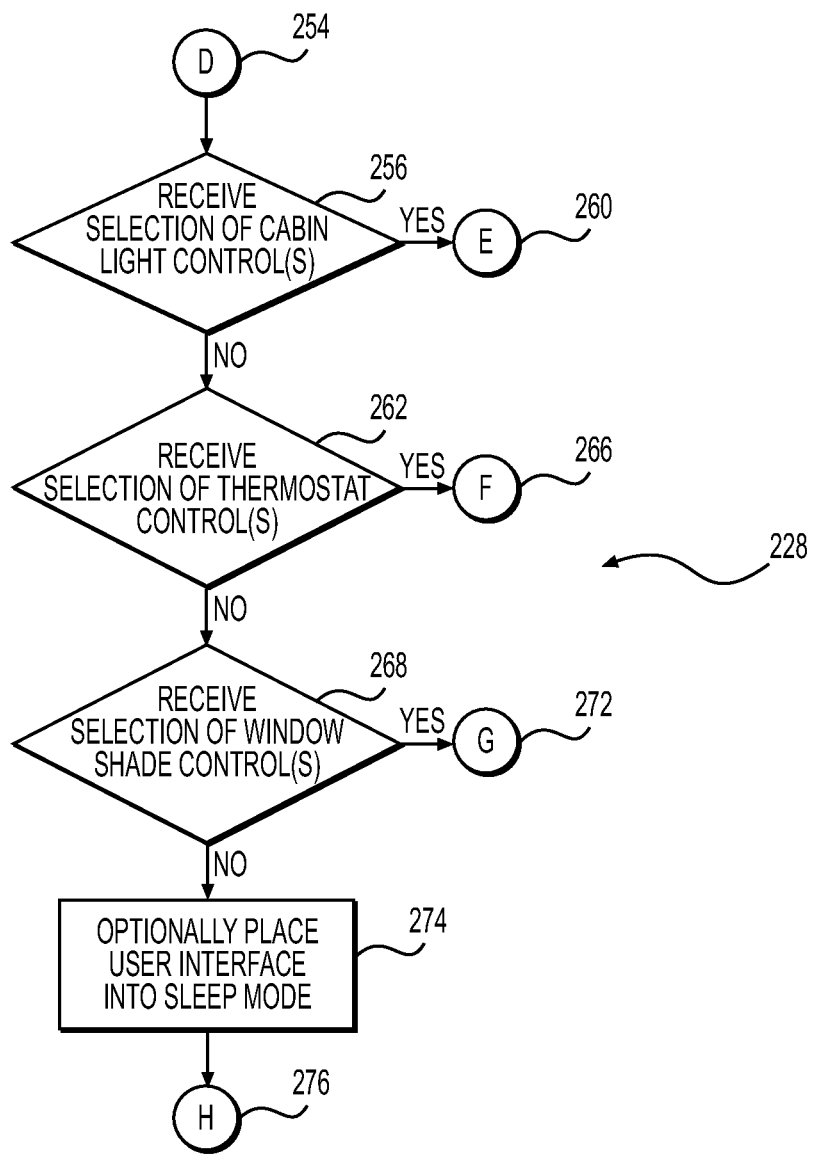

FIG. 16 illustrates one method 210 contemplated by the present invention. The method 210 is considered to be generic to the operation of the side ledge IO node 30, 100, 140 of the present invention.

In the discussion that follows, reference is made to the side ledge IO node 140 for simplicity. While reference is made solely to the side ledge IO node 140, the methods that are described herein may be applied equally to the side ledge IO nodes 30, 100 without departing from the scope of the present invention.

The method 210 begins at step 212. From the start 212, the method 210 proceeds to step 214 where the method 210 optionally receives input activating the user interface associated with the side ledge IO node 140.

It is contemplated that the side ledge IO node 140 might not provide any display until activated. As noted above, a passenger or crew member may activate the side ledge IO 140 by touching the touch-sensitive surface thereof. Alternatively, a switch (not shown) may be provided to turn on or turn off the side ledge IO node 140.

Separately, it is contemplated that the side ledge IO node 140 may operate such that the side ledge node 140 remains in a constant on mode of operation. In this contemplated mode of operation, the side ledge IO node 140 may provide a display at all times during flight.

From optional step 214, the method 210 proceeds to step 216, where a menu for controllable parameters is displayed. The menu includes, but is not limited to, a display of the table lighting icon 154, the media icon 156, the reading light icon 158, the cabin lighting icon 178, the thermostat icon 180, and the window shade icon 182. As discussed above, each of these icons is associated with a controllable parameter on board the aircraft 36.

The method 210 then proceeds to step 218, where a selection of one of the controllable parameters is received by the method 210. As noted above, the input may be received when a person taps on a particular icon 154, 156, 158, 178, 180, 182. In an alternative contemplated operation, the user may use a swiping motion to access the menus associated with the icons 154, 156, 158, 178, 180, 182. Specifically, the user may use a swiping motion, by dragging his or her finger across the surface of the side ledge IO node 140, to navigate through the different menus associated with each of the icons 154, 156, 158, 178, 180, 182. Still further, the user may turn the knob 142 to access one or more of the functions associated therewith.

If no input is received at step 218, the method 210 proceeds to an optional step 220 where the side ledge IO node 140 is placed into a sleep mode. In the sleep mode, the side ledge IO node 140 may go dark. Alternatively, it may continue to display the screen last selected by a user. In still another embodiment, the side ledge IO node 140 may default to the main menu 162, 175. As noted above, where a knob 142 is employed, the knob 142 may optionally retract into the side ledge 98.

If the user selects one of the controllable parameters by selecting one of the icons 154, 156, 158, 178, 180, 182, the method 210 proceeds to step 222. At step 222, the method 210 displays the controls appropriate for the selected controllable parameter. For example, if the table light icon 154 is selected, the light intensity menu 166 may be displayed. A color light menu also may be displayed as another lighting option for the table light.

Once the control(s) are displayed, the method 210 proceeds to step 224. At step 224, the method 210 receives control input(s) from the user to adjust one or more of the controllable parameters in the cabin 48 of the aircraft 36.

After receiving the input at step 224, the method 210 proceeds to step 226, where the selected, controllable parameters are adjusted according to the input provided by the user.

After step 226, the method 210 is contemplated to return to step 216 and display the main menu 162, 175.

As noted above, it is contemplated that the side ledge IO node 140 will operate after being awakened by a person's touch. In keeping with this mode of operation, it is contemplated that the side ledge IO node 140 will enter into a sleep mode (or go dark) after the expiry of a predetermined time period. For example, if the side ledge IO node 140 has not received tactile input for a period of two (2) minutes, the side ledge IO node 140 will be instructed to enter into the sleep mode where it will await the next command.

FIGS. 17-24 illustrate a second method of operation of the side ledge IO node 140 of the present invention.

The method begins at step 230, where it transitions to the optional step 232 of receiving input activating the user interface, which is the side ledge IO node 140. As with the first method 210, this second method 228 is described in connection with the side ledge IO node 140. However, this second method 228 may be employed with any of the other embodiments of the side ledge IO node 30, 100.

As noted above, the step 232 is optional in instances where the side ledge IO node 140 is in a constant on state during operation of the aircraft 36. Alternatively, the side ledge IO node 140 may have been activated previously, therefore not requiring activation at this step.

From step 232, the method 228 proceeds to step 234, where the side ledge IO node 140 displays a menu for controllable parameters that are available on the aircraft 36. As noted above, this menu includes, but is not limited to, the options menu 162 and the additional options menu 175. As also noted above, it is contemplated that the options menu 162 will be the default menu, but this is not required to practice the present invention. Moreover, the side ledge IO node 140 may present initial menus to the user that depart from the embodiments described herein.

From step 234, the method 228 proceeds to step 236, where the method 228 receives a selection of the table light control(s). The table light control(s) are accessible when the user selects the table light icon 154. As noted above, the manner in which the user selects the table light icon 154 is not critical to operation of the method 228 of the present invention. The user may select the table light icon 154 by tapping on the surface 144 of the knob 142 in the vicinity of the display location of the table light icon 154. Separately, the user may employ a swiping motion to access the functionality associated with the table light icon 154. Still further, the user may turn the knob 142 to access the table light icon 154. Combinations of tapping, swiping, and turning the knob 142 also may be employed without departing from the scope of the present invention.

Figure 19:
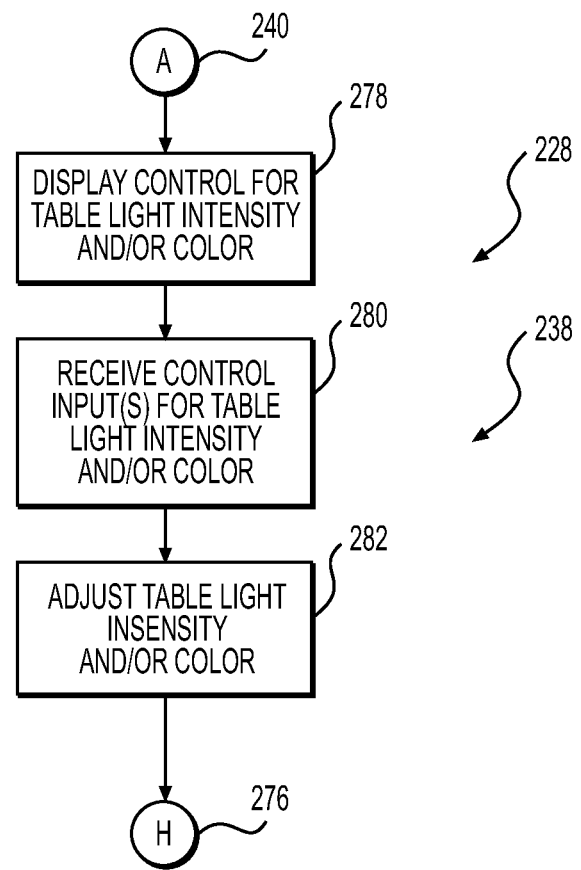

If the user selects the table light control(s), the method 228 proceeds to the table light subroutine 238, via the connector 240. The table light subroutine 238 is illustrated in FIG. 19 and is described in greater detail below.

Figure 20:
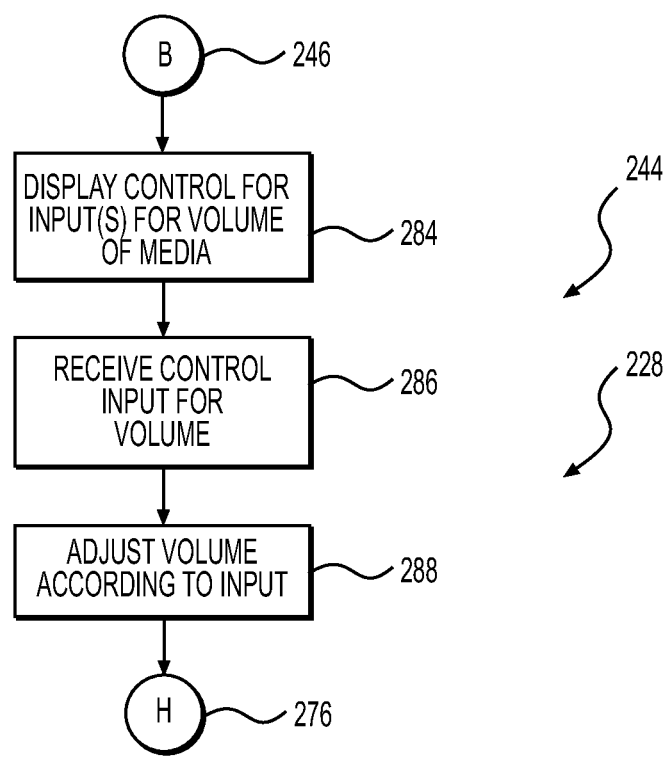

If the user does not select the table light control(s), the method 228 proceeds to step 242 where the method awaits receipt of a selection of media control(s). If the user selects the media icon 156, the method 228 proceeds to the media subroutine 244 via the connector 246. The media subroutine 244 is illustrated in FIG. 20 and is described in greater detail below.

Figure 21:
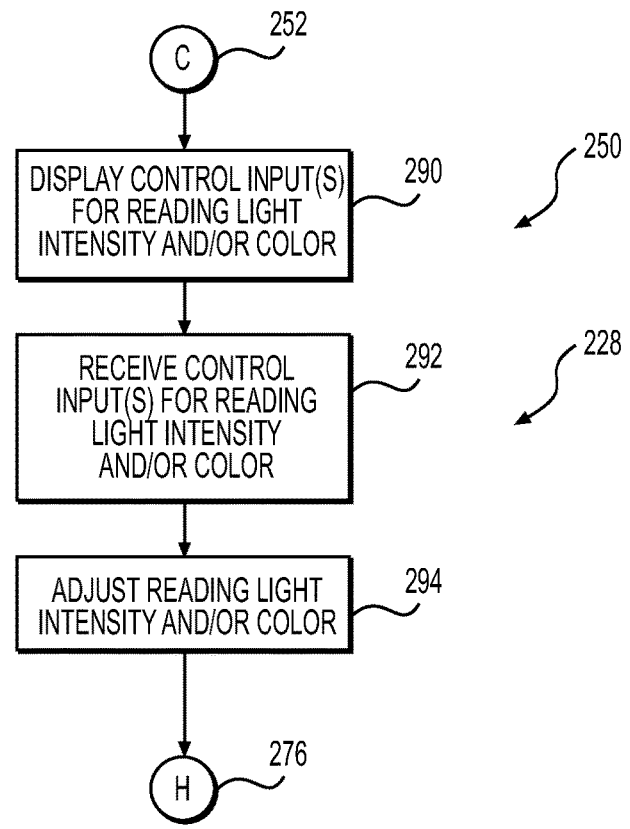

If the user does not select the media control(s), the method 228 proceeds to step 248 where the method 228 awaits receipt of a selection of the reading light control(s). If the user selects the reading light icon 158, the method 228 proceeds to the reading light subroutine 250, which is illustrated in FIG. 21 and is described in greater detail below.

Figure 22:
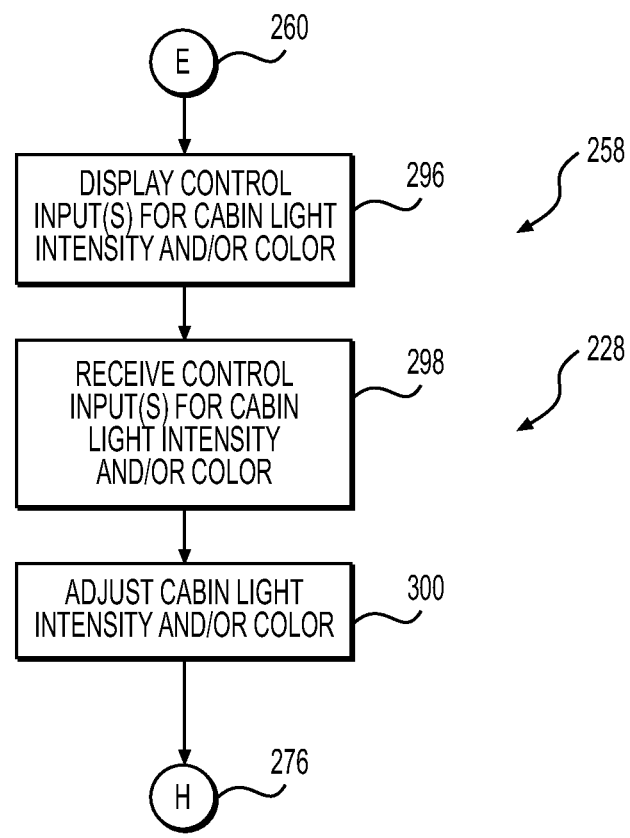

If the user does not select the reading light control(s) in step 248, the method proceeds, via the connector 254, to step 256. At step 256, the method 228 queries if there has been a selection of the cabin light control(s), which may be accessed via the cabin light icon 178. If the user selects the cabin light icon 178, the method 228 proceeds to the cabin light subroutine 258, which is illustrated in FIG. 22, via the connector 260. The cabin light subroutine 260 is discussed in greater detail below.

Figure 23:
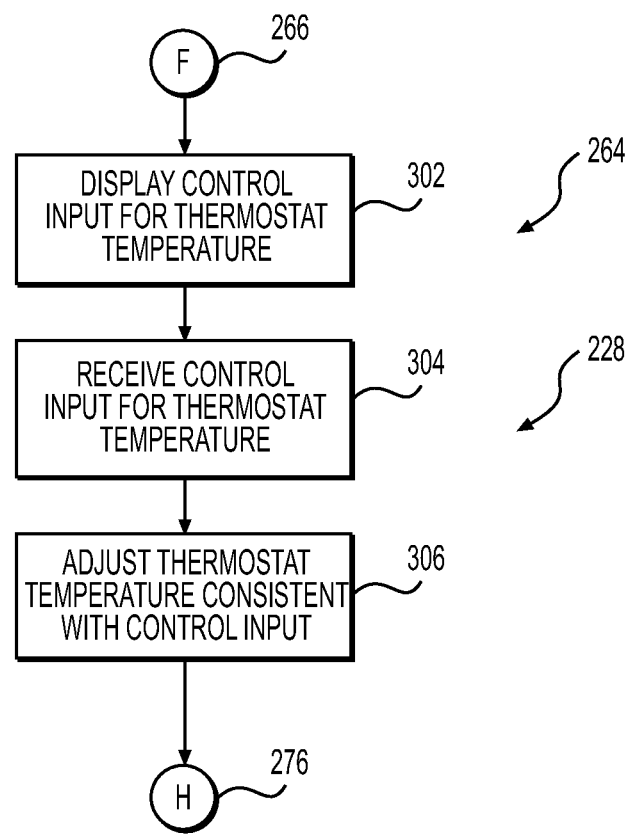

If the user does not select the cabin light control(s), the method 228 proceeds to step 262. At step 262, the method 228 awaits receipt of a selection of the thermostat controls, which may be accessed via the thermostat icon 180. If the user selects the thermostat icon 180, the method 228 proceeds to the thermostat subroutine 264 via the connector 266. The thermostat subroutine 263 is illustrated in FIG. 23 and is discussed in greater detail below.

Figure 24:
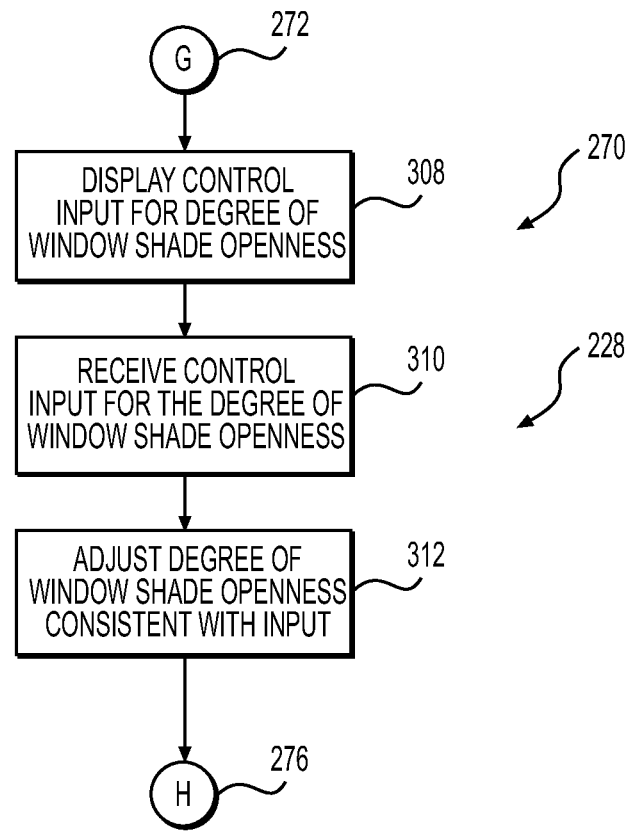

If the user does not select the thermostat control(s), the method 228 proceeds to step 268, where the method 228 awaits receipt of a selection of the window shade control(s). If the user selects the window shade control(s) in step 268, the method 228 proceeds to the window shade subroutine 270 that is illustrated in FIG. 24. The window shade subroutine 270 connects to the method 228 via the connector 272. The window shade control(s) are accessible after the user selects the window shade icon 182.

If the user does not select the window shade control(s), the method 228 proceeds to step 274, where the user interface is optionally placed into a sleep mode. From the step 274, the method 228 returns to step 232 via the connector 276.

With respect to the steps 236, 242, 248, 256, 262, 268, it is noted that these steps need not be executed serially. They may be executed in parallel or in any other suitable combination. Moreover, these steps need not be executed in the order presented. They may be executed in any suitable order without departing from the scope of the present invention. The method 228 is understood to await receipt of input at any of the steps 236, 242, 248, 256, 262, 268 before executing appropriate instructions.

FIG. 19 illustrates the table light subroutine 238 of the method 228. The table light subroutine 238, which is accessible after the user selects the table light icon 154, starts at step 278. At this step, the table light subroutine 238 displays the control(s) for one or both of light intensity and light color. As indicated above, light intensity refers to the brightness of the light generated by the light above the table 76, 80. It is contemplated that the light intensity will be controllable between a fully off position (i.e., 0 lumens) and a predetermined maximum brightness. Color refers to the amount of red and/or blue that is included in the light being emitted. Cooler light includes more blue hues while warmer light includes more red hues. It is contemplated that control over the color of the light will involve selecting between warmer and cooler lighting tones. As noted, control also may be provided over the RGB values associated with the table light.

From step 278, the method 228 proceeds to step 280, where the method 228 receives control input(s) for the intensity and/or color of the table light from the user. This may be provided by way of a control bar and slider or by rotation of the knob 142, for example.

The method 228 then proceeds to step 282 where the table light is adjusted consistently with the control input(s) provided by the user.

After step 282, the method 228 returns to step 232 via the connector 276.

FIG. 20 illustrates the media control(s) subroutine 244. In this subroutine 244, the user is presented with controls for adjusting the volume of the media being played. It is noted, however, that the user may be presented with other controls without departing from the scope of the present invention.

The media subroutine 244 starts at step 284, where the method 228 displays control inputs for control of one or more aspects of the selected media. The media subroutine 244 is accessible after activation of the media icon 156. In this specific example, the display concerns the volume level of the media, but other parameters may be adjusted without departing from the scope of the present invention. For example, if the media included a video file, it may be possible for the user to adjust the brightness of the video screen, etc. With respect to the volume, it is contemplated that the volume will be adjustable between 0 dB and a predetermined maximum amount.

After step 284, the method 228 proceeds to step 286, where the method receives a control input regarding the volume of the media being played. The control input may be provided via touch control in connection with a control bar and slider. Alternatively, control input may be provided by rotation of the knob 142.

Once control input is provided, the method 228 proceeds to step 288 where the volume of the media is adjusted according to the inputs from step 286.

FIG. 21 illustrates the reading light subroutine 250. The reading light subroutine 250 is similar to the table light subroutine 238, except that the control parameters relate to a reading light accessible by the user.

The reading light subroutine 250 starts at step 290, where the method 228 displays the control input(s) for the reading light. The control input(s) include, but are not limited to the intensity and color of the light.

At step 292, the method 228 receives control input(s) for the reading light. The control inputs may be provided by turning the knob 142, as discussed above.

After the control input(s) are received, the method 228 proceeds to step 294 where adjustments to the reading light are made based on the inputted parameters.

After step 194, the method 228 returns to step 232 via the connector 276.

FIG. 22 illustrates the cabin light subroutine 258. The cabin light subroutine 258, which is accessible after selecting the cabin lights icon 178, operates in the same manner as the reading light subroutine 250. Here, the user is provided with control over the lights in the interior of the cabin 48 of the aircraft 36. As noted above, the user may control all of the lights within the aircraft 46 or a subset of the lights that are available in the aircraft. For example, the user may be afforded control over the cabin lights in a selectable zone within the cabin 48 of the aircraft 36. As before, parameters that may be controlled include control over the intensity of the lights as well as control over the color of the lights.

The cabin light subroutine 258 begins at step 296 where the controls for the cabin light are displayed to the user. At step 298, the user provides inputs to alter the operating parameters of the cabin lights. At step 300, the method 228 adjusts the operating parameters of the cabin lights based on the inputted control parameters. The method 228 then returns to step 232 via the connector 276.

FIG. 23 illustrates the thermostat subroutine 264 contemplated as a part of the present invention. The thermostat subroutine is accessible by activating the thermostat icon 180.

The thermostat subroutine 264 begins at step 302, where the control(s) over the thermostat are displayed to the user. In the case of the side ledge IO node 140, this includes display of controls on the display 146 of the knob 142. It is contemplated that the thermostat control will include, inter alia, control over the temperature within the cabin 48 of the aircraft 36. The temperature control is contemplated to be adjustable within ten degrees Celsius of a standard ambient temperature of 25° C. As a result, it is contemplated that the temperature may be manipulated between 15-35° C. The temperature may be controlled in the whole cabin 48 of the aircraft or a specified zone within the cabin 48 of the aircraft 36.

At step 304, the method 228 receives input from the user, setting a temperature for the cabin 48. The input may be received, for example, when the user turns the knob 142.

The method 228 then proceeds to step 306, where the method 228 provides output to adjust the temperature within the cabin consistently with the input provide by the user.

After step 306, the method 228 returns to step 232 via the connector 276.

FIG. 24 illustrates the window shade subroutine 270 according to the present invention. The window shade subroutine 270 provides access to control over the degree of openness of the window shade(s) in the cabin 48 of the aircraft 36. It is noted that the window shade subroutine 270 may provide access over a single window shade (i.e., the window shade immediately adjacent to the user), a plurality of window shades that define a zone within the aircraft 36, or all of the window shades in the aircraft 36.

The window shade subroutine 270 begins at step 308 where the controls for the window shades is displayed to the user.

The method 228 proceeds to step 310 where the method 228 awaits input from the user with respect to the degree to which one or more of the window shades are opened.

After input is received by the method 228, the method 228 proceeds to step 312, where the window shade or shades are opened consistent with the input provided by the user.

The method 228 then proceeds to step 232 via the connector 276.

As should be apparent from various figures, the present invention is contemplated to provide general, localized, and individualized control via the side ledge node 30. Control may be provided for the cabin 48 as a whole. Selective control may alternatively be provided for zones within the aircraft 36. Finally, the user is provided with control over functionality associated with a passenger's seat 74.

As discussed above, inputs provided by any of the IO nodes 20, 22 and 28-34 are first provided to the controller 16. The reason for this is simple: the controller 16 provides overall control for the functions that are available to passengers in the cabin 48. Without a centralized control, it is possible that passengers might issue instructions that are contrary to one another. The controller 16 may be programmed to address these conflicts or issue an alarm when conflicts arise.

As noted above, it is contemplated that the controller 16 will incorporate a command hierarchy that will resolve any conflicts between the various inputs received from the various nodes 20, 22, 28, 30, 32, 34. The command hierarchy may be based on the status of the person (i.e., crew versus passenger) or based on the location of the IO node (i.e., window IO node 34 versus bulkhead IO node 28). It is also noted that the command and control functions need not be incorporated solely in the controller 16 but may be incorporated into other features without departing from the scope of the present invention.

As also noted above, the present invention contemplates reliance on an isometric view of the cabin 48 of the aircraft 36. The isometric view permits a user to select specific controllable features and zones within the aircraft 36. For example, the user may select one of the passenger seating areas 58, 60, 62 over which control is to be asserted. Alternatively, the user may select an individual seat 74 over which controls are to be asserted. Still further, by selecting a suitable icon from an isometric view of the cabin 48 of the aircraft 36, the user may assert control over one or more of the monitors 96 within the aircraft 36. The isometric view of the cabin 48 of the aircraft 36 provides an easily understood interface for a user to direct inputted commands and assert control over one or more controllable parameters within the cabin 48 of the aircraft 36.

As noted above, the present invention is not intended to be limited solely to the embodiment(s) described herein. To the contrary, those skilled in the art should appreciate that the present invention may be embodied in one or more variations and equivalents to the embodiment(s) described herein. The present invention is intended to encompass those variations and equivalents.

What is claimed is:

1. A knob for displaying a graphical user interface for use in controlling controllable parameters of an aircraft cabin, the knob comprising:
   a movable body portion; and
   a top surface on which is disposed a touch-sensitive display;
   wherein the knob:
      displays a menu of controllable parameters for the aircraft cabin on the touch-sensitive display, the menu of controllable parameters comprising at least two controllable parameters selected from a group comprising light intensity, light color, temperature, media type, media content, media volume, and the degree of openness of at least one window shade;
      receives an input of a selected controllable parameter from the menu of controllable parameters;
      displays a control for the selected controllable parameter; and
      receives a control input for the selected controllable parameter, the control input being received through one of movement of the movable body portion and through touch of the touch-sensitive display, the selected controllable parameter being adjusted consistently with the control input,
      wherein the knob has a retracted position and a deployed position, wherein, in the deployed position, the top surface of the knob is above a surface of a side ledge in the aircraft cabin, and wherein the knob is responsive to touch of the touch sensitive display for transitioning between the retracted position and the deployed position by a powered device deploying the knob from the side ledge.

2. The knob of claim 1, wherein the movable body portion receives the input and the control input via at least one of turning and toggling.

3. The knob of claim 1, wherein the touch-sensitive display receives the input and the control input via at least one of tapping and swiping.

4. The knob of claim 1, wherein in the retracted position, the top surface of the knob is flush with the surface of the side ledge in the aircraft cabin.

5. The knob of claim 1, wherein turning of the movable body portion controls scrolling through the menu of controllable parameters.

6. The knob of claim 1, wherein passage of a predetermined period of time triggers a sleep mode, causing the knob to move from the deployed position to the retracted position.

7. The knob of claim 1, wherein the menu of controllable parameters comprises at least one icon associated with the selected controllable parameter.

8. The knob of claim 1, wherein:
after display of the control for the selected controllable parameter, the control input is provided by the tapping, swiping, turning, or toggling.

9. The knob of claim 8, wherein the menu of controllable parameters is associated with at least one of the entire cabin of the aircraft, at least one zone within the cabin of the aircraft, or at least one seat within the cabin of the aircraft.

10. The knob of claim 1, further comprising:
a flight attendant call button disposed adjacent to the knob, in proximity to the knob, for tandem actuation with the knob.

11. A method of operation of a system including a knob for displaying a graphical user interface for use in controlling controllable parameters of an aircraft cabin, the knob comprising a movable body portion, and a top surface on which is disposed a touch-sensitive display, the method comprising:
displaying a menu of controllable parameters for the aircraft cabin on the touch-sensitive display, the menu of controllable parameters comprising at least two controllable parameters selected from a group comprising light intensity, light color, temperature, media type, media content, media volume, and the degree of openness of at least one window shade;
receiving an input of a selected controllable parameter from the menu of controllable parameters;
displaying a control for the selected controllable parameter; and
receiving a control input for the selected controllable parameter, the control input being received through one of movement of the movable body portion and through touch of the touch-sensitive display, the selected controllable parameter being adjusted consistently with the control input,
wherein the knob has a retracted position and a deployed position, wherein, in the deployed position, the top surface of the knob is above a surface of a side ledge in the aircraft cabin, and wherein the knob is responsive to touch of the touch sensitive display for transitioning between the retracted position and the deployed position by a powered device deploying the knob from the side ledge.

12. The method of claim 11, further comprising:
prioritizing the control input received from the graphical user interface in relation to control inputs received from any other input device, thereby avoiding conflicts between the control inputs.

13. The method of claim 11, further comprising:
placing the graphical user interface into a sleep mode if selection of a controllable parameter is not received.

14. The method of claim 11, wherein the input and the control input are received from at least one of turning and toggling the movable body portion of the knob.

15. The method of claim 11, wherein the input and the control input are received from at least one of tapping and swiping on the touch-sensitive display.

16. The method of claim 11, further comprising:
retracting the movable body portion to a retracted position, wherein the top surface is flush with a surrounding surface when in the retracted position; and
deploying the movable body portion to a deployed position from the retracted position, wherein the top surface is above the surrounding surface when in the deployed position.

17. The method of claim 11, wherein the turning of the movable body portion controls scrolling through the menu of controllable parameters.

18. The method of claim 11, further comprising:
after passage of a predetermined period of time, triggering a sleep mode, causing the knob to move from the deployed position to the retracted position.

19. A knob for displaying a graphical user interface for use in controlling controllable parameters of an aircraft cabin, the knob comprising:
a movable body portion for receiving a first user input; and
a touch-sensitive display for receiving a second user input;
wherein the knob:
displays a menu of controllable parameters for the aircraft cabin on the touch-sensitive display, the menu of controllable parameters comprising at least two of light intensity, light color, temperature, media type, media content, media volume, and the degree of openness of at least one window shade;
receives a selected controllable parameter from the menu of controllable parameters via at least one of the first and the second user inputs;
displays a control for the selected controllable parameter; and
receives a control input for the selected controllable parameter, the control input being provided by at least one of the first and second user inputs, the selected controllable parameter being adjusted consistently with the control input,
wherein the knob has a retracted position and a deployed position, wherein, in the deployed position, the top surface of the knob is above a surface of a side ledge in the aircraft cabin, and wherein the knob is responsive to touch of the touch sensitive display for transitioning between the retracted position and the deployed position by a powered device deploying the knob from the side ledge.

20. An aircraft comprising:
a cabin light;
a cabin window shade;
a cabin knob controllable by a user, the cabin knob comprising:
a touch-sensitive display providing a menu of controllable parameters, the controllable parameters comprising light intensity and a degree of openness of the cabin window shade, the touch-sensitive display enabling at least one of:
selection of one of the controllable parameters; and
control over a setting of the selected one of the controllable parameters;
a movable body portion for enabling:
selection of one of the controllable parameters; and
control over a setting of the selected one of the controllable parameters, wherein the knob has a retracted position and a deployed position, wherein, in the deployed position, the top surface of the knob is above a surface of a side ledge in the aircraft cabin, and wherein the knob is responsive to touch of the touch sensitive display for transitioning between the retracted position and the deployed position by a powered device deploying the knob from the side ledge.

* * * * *